United States Patent [19]
Maeda

[11] Patent Number: 5,648,709
[45] Date of Patent: Jul. 15, 1997

[54] CONTROL METHOD AND CONTROL APPARATUS FOR CONTROLLING OUTPUT PATH AND DYNAMIC CHARACTERISTICS OF A NON-LINEAR SYSTEM

[75] Inventor: Yoshiharu Maeda, Kawasaki, Japan

[73] Assignee: Fujitsu Limited, Kawasaki, Japan

[21] Appl. No.: 422,826

[22] Filed: Apr. 17, 1995

[30] Foreign Application Priority Data

Apr. 18, 1994 [JP] Japan ................................ 6-078814

[51] Int. Cl.$^6$ ........................... G05B 17/00; G06F 15/00
[52] U.S. Cl. .................... 318/568.17; 318/568.1; 318/568.12; 395/95; 395/97
[58] Field of Search ................. 318/560–696; 901/3, 5, 7, 9, 20–44; 395/95, 97, 98, 22, 903; 364/431.01

[56] References Cited

U.S. PATENT DOCUMENTS

| | | | |
|---|---|---|---|
| 4,989,161 | 1/1991 | Oaki | 364/513 |
| 4,999,553 | 3/1991 | Seraji | 318/561 |
| 5,294,873 | 3/1994 | Seraji | 318/568.1 |
| 5,367,612 | 11/1994 | Bozich et al. | 395/22 |
| 5,377,310 | 12/1994 | Jain et al. | 395/95 |

*Primary Examiner*—Paul Ip
*Attorney, Agent, or Firm*—Staas & Halsey

[57] ABSTRACT

The present invention relates to a control method and a control apparatus for controlling a system output of a non-linear system with dynamic characteristics that vary corresponding to a control input. A value corresponding to dynamics of the non-linear system and a value corresponding to part of the dynamic characteristics are calculated from the control input. When desired trajectories are assigned to the system output and the part of the dynamic characteristics, the control input is updated so that the calculated value corresponding to the dynamics and the calculated value corresponding to the part of the dynamic characteristics accomplish the desired trajectories.

20 Claims, 22 Drawing Sheets

CONTROL METHOD AND CONTROL APPARATUS FOR CONTROLLING OUTPUT PATH AND DYNAMIC CHARACTERISTICS OF A NON-LINEAR SYSTEM

BACKGROUND OF THE INVENTION

1. Field of the Invention

The present invention relates to a control method and a control apparatus for controlling both an output of a non-linear system (in which dynamic characteristics that vary corresponding to a control input) and dynamic characteristics (such as a viscous characteristic, an elastic characteristic, and mass (inertial force)) of the system at the same time and obtains a control input that simultaneously satisfies both target paths for the system output and the dynamic characteristics.

2. Description of the Related Art

A manipulator that is driven by artificial muscles is an example of a non-linear system.

Examples of the artificial muscles are pneumatic rubber type artificial muscles, wires, and so forth. The pneumatic rubber type artificial muscle is constructed of a rubber tube that is contracted by air pressure and thereby generates a tension. In the wire type artificial muscle, viscous and elastic characteristics are provided by feedback control. Since both types have variable viscous and elastic characteristics and produce only a tension, they are similar to natural muscles.

In a manipulator driven by artificial muscles, a pair of artificial muscles are disposed around each joint so that one artificial muscle is in contention with the other paired artificial muscle.

The difference of torques produced in the contended muscles becomes a resultant torque of the joint. In addition, when antagonistic muscles are operated at the same time, the viscous and elastic characteristics of a joint can be adjusted.

Thus, by controlling the viscous and elastic characteristics of each joint, the overall dynamic characteristics of the manipulator can be controlled. When a robot manipulator is operated, dynamic and mechanical interactions take place between the manipulator and its environment (for example, a workpiece). Examples of these interactions are deburring operations, part mounting operations, surface abrading operations.

The manipulator that performs such operations should have a compliant property to an external force applied from the environment so as to prevent the manipulator itself and the environment (workpiece) from being broken.

When the manipulator has compliance to an external force, it can be displaced while it produces a reactionary force against the force applied to it from the environment in the same manner that when force is applied to a spring, the length thereof varies.

The compliance of the manipulator can be represented by a mechanical impedance. The mechanical impedance can be represented by the apparent inertia, viscosity, and elasticity of an end-point (contacting edge) of the manipulator.

When a manipulator has a compliant property to the environment and the compliance thereof can be freely assigned, complicated operations such as parts mounting operations and human interfacing operations can be executed with simpler commands than those of conventional rigid type manipulators.

As means for providing manipulators with compliance, RCC (Remote Center Compliance) device, impedance control (including compliance control), manipulators driven by artificial muscles, and so forth have been proposed.

The RCC device is a hardware apparatus that provides a manipulator with compliance by mechanical elasticity such as springs. Since this apparatus uses springs, it is difficult to freely assign physical constants and positions of the springs. Thus, a dedicated hardware system should be provided corresponding to the operational environment.

In the impedance control method, a mechanical impedance is provided to the end-point (effector) of the manipulator by a controller.

In the impedance control method, since the compliance is accomplished by software, and although the compliance can be freely assigned, the control is difficult. This method has not been practically employed.

On the other hand, in the manipulator that is driven by artificial muscles, the compliance (dynamic characteristics) of the manipulator can be controlled by simultaneously operating antagonistic artificial muscles with variable viscosity and elasticity.

The artificial muscle type manipulator has the advantages of being flexible and light, and it is expected to be used for applications such as human interfacing operations (free from causing damage to human beings) and high place operations that cannot be performed by the conventional manipulators. However, the artificial muscle type manipulator has the following problems.

Firstly, since the artificial muscles only produce tension, they should be disposed around each joint so that they are in contention with each other. Thus, the number of the required artificial muscles is twice as many as the number of joints. Consequently, the control input to the artificial muscles has excessive degrees of freedom and thereby the control input becomes redundant.

Secondly, since the artificial muscles are sometimes non-linear systems, it is difficult to cause a required torque to be produced at a particular joint.

Thirdly, although the dynamic characteristics of the manipulator can be varied, a control method such as a calculation torque method using inverse dynamics (inverse model of an equation of motion) cannot be easily employed.

Because of such problems, the control of the artificial muscle type manipulator has been made only for a position control. The variability of the dynamic characteristics has just been verified. Practical methods for controlling and employing the artificial muscle type manipulators have not yet been proposed.

SUMMARY OF THE INVENTION

A first object of the present invention is to provide a control method and a control apparatus for obtaining a control input that simultaneously accomplishes desired trajectories of a system output and dynamic characteristics of a non-linear system such as an artificial muscle type manipulator, having a redundant control input and dynamic characteristics that vary corresponding to the control input so as to control the non-linear system.

A second object of the present invention is to provide a control apparatus for a non-linear system that can control both a system output and dynamic characteristics even if the dynamic characteristics of the non-linear system are unknown.

A third object of the present invention is to provide a control apparatus for a non-linear system that can freely select a priority in control of a system output and dynamic characteristics.

A fourth object of the present invention is to provide a control apparatus for a non-linear system that can accomplish desired trajectories of a non-linear system in the case that the degree of freedom of a control input of the non-linear system is more redundant than the degree of freedom of a system output and dynamic characteristics to be controlled, and that can obtain an optimum control input corresponding to a revised evaluation criterion.

The present invention provides a control apparatus for controlling an output of a non-linear system with dynamic characteristics that vary. The control apparatus comprises a dynamics calculating portion and a dynamic characteristics calculating portion. The dynamics calculating portion calculates a value corresponding to dynamics of the non-linear system. The dynamic characteristics calculating portion calculates a value corresponding to the dynamic characteristics of the non-linear system.

When a control input is supplied to the dynamics calculating portion, it calculates an output trajectory corresponding to the dynamics of the non-linear system. When the control input is supplied to the dynamic characteristics calculating portion, it calculates an output corresponding to the dynamic characteristics of the non-linear system. Thereafter, an error between a desired output trajectory and a calculated trajectory of the calculated dynamics is calculated. The error is inversely propagated to the dynamics calculating portion. Likewise, an error between a target path of the given dynamic characteristics and the calculated dynamic characteristics is calculated. The error is inversely propagated to the dynamic characteristics calculating portion. By the two inverse propagating operations, the control input is updated so that the two errors decrease. When the values of the two errors are smaller than a predetermined value, the obtained control input is supplied to the non-linear system.

These and other objects, features and advantages of the present invention will become more apparent in light of the following detailed description of best mode embodiments thereof, as illustrated in the accompanying drawings.

DESCRIPTION OF PREFERRED EMBODIMENTS

Figure 1:
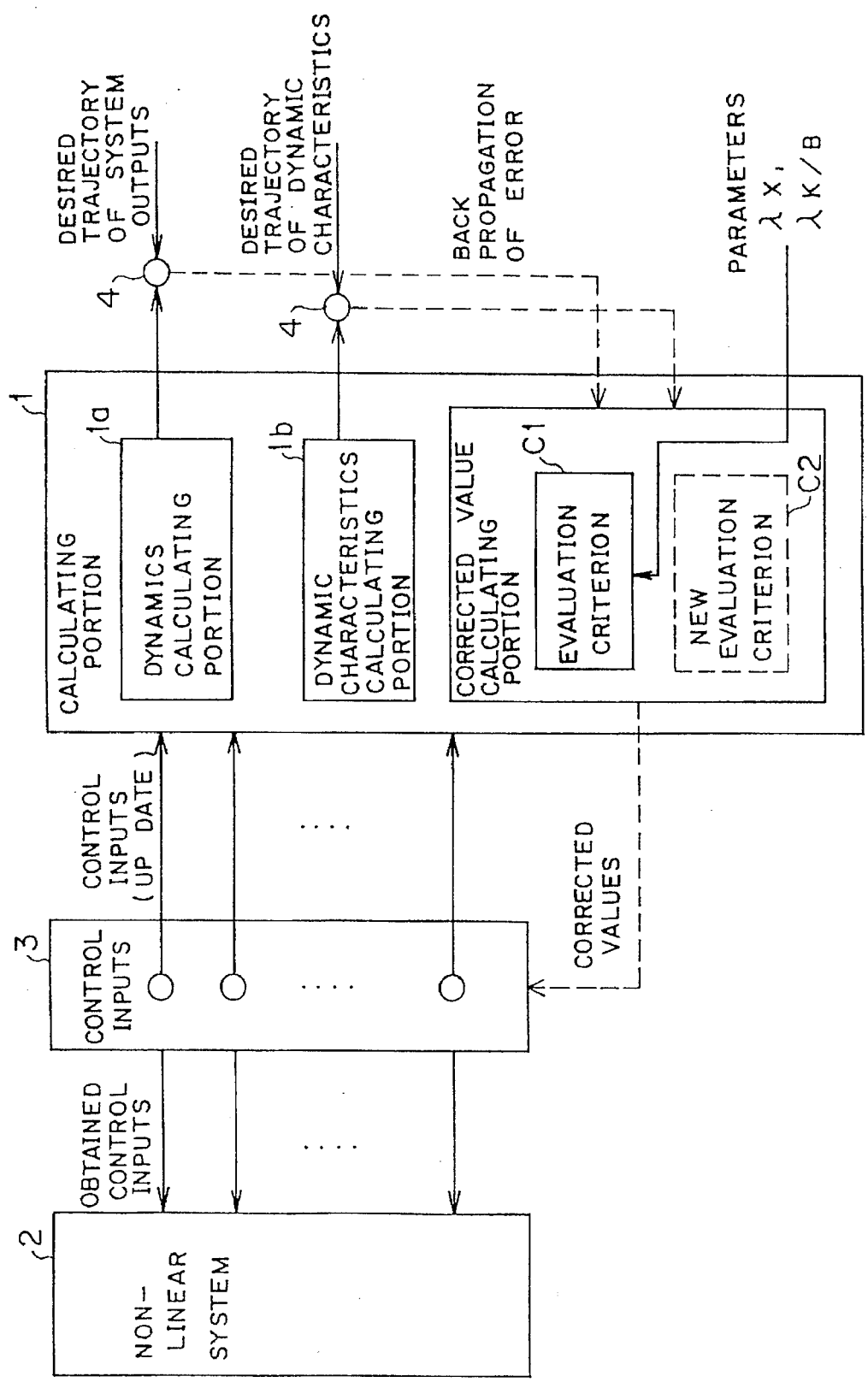
FIG. 1 is a block diagram for explaining the theory of the present invention.

FIG. 1 is a block diagram for explaining the theory of the present invention. In FIG. 1, reference numeral 1 represents a calculating portion. Reference numeral 2 represents a non-linear system constructed of, for example, an artificial muscle type manipulator or the like. The calculating portion 1 has a dynamics calculating portion 1a and a dynamic characteristics calculating portion 1b. The dynamics calculating portion 1a calculates an output corresponding to dynamics of the non-linear system 2. The dynamic characteristics calculating portion 1b calculates an output corresponding to dynamic characteristics to be controlled. When control inputs are supplied, an output corresponding to the dynamics of the non-linear system 2 and an output corresponding to the dynamic characteristics (viscous characteristic, elastic characteristic, and mass) are generated.

Reference numeral 4 represents comparators that compare the output corresponding to the dynamics of the non-linear system 2 that are output from the calculating portion 1, the output corresponding to the dynamic characteristics thereof, and their desired trajectories, and generate their errors. The errors are back-propagated to the calculating portion 1. The calculating portion 1 calculates corrected values of the control inputs so as to reduce the errors and supply the corrected control inputs to the non-linear system.

Reference letter C1 represents an evaluation criterion for obtaining corrected values of the control inputs so as to accomplish desired trajectories. Reference letter C2 represents a new evaluation criterion that is added in the case that the degree of freedom of the control inputs of the non-linear system 2 is more redundant than the degree of freedom of the system outputs and the dynamic characteristics to be controlled.

Thus, as shown in FIG. 1, in the method for controlling the non-linear system 2 with dynamic characteristics that vary corresponding to the control inputs, when desired trajectories are assigned to the system outputs of the non-linear system and part of the dynamic characteristics thereof, control inputs of the non-linear system that accomplish the desired trajectories are obtained. By supplying the obtained control inputs to the non-liner system 2, the system outputs of the non-linear system 2 and the part of the dynamic characteristics of the non-linear system 2 are controlled.

In addition, the control apparatus of the nonlinear system with dynamic characteristics that vary corresponding to the control inputs, has the dynamics calculating portion 1a that outputs a portion corresponding to the dynamics of the non-linear system 2, and the dynamic characteristics calculating portion 1b that outputs a portion corresponding to the dynamic characteristics. When desired trajectories are assigned to the system outputs and part of the dynamic characteristics of the non-linear system 2, the dynamics calculating portion 1a and the dynamic characteristics calculating portion 1b calculate the control inputs so that the outputs correspond with the above-described target paths and supply the control inputs to the non-linear system 2 so as to control the output paths and the dynamic characteristics of the non-linear system.

Next, a neural network as the dynamic characteristics calculating portion 1b that outputs the dynamic characteristics of the non-linear system 2 will be described.

The neural network is employed as the dynamic characteristics calculating portion 1b that outputs the dynamic characteristics of the non-linear system 2. The neural network is accomplished by the following steps (a) to (c).

(a) Control inputs are supplied to the non-linear system. The relationship between the control inputs, the state amount of the non-linear system, and the torque thereof are obtained. The obtained results are learned by a first neural network.

(b) The control inputs and the state amount are supplied to the input side of the first neural network. While the synapse weight of the neural network is fixed, an error signal of the torque is back-propagated from the output side of the first neural network. A Jacobjan corresponding to the dynamic characteristics of the non-linear system is obtained from the input side of the first neural network. Corresponding to the Jacobjan and the error signal, the relationship between the control inputs, the state amount, and the dynamic characteristics of the non-linear system are obtained.

(c) The relationship between the control inputs, the state amount, and the dynamic characteristics are learned by a second neural network. Thus, a neural network that outputs dynamic characteristics is accomplished.

When the control inputs of the non-linear system are obtained using the above-described neural network that has learned the data, optimum control inputs that accomplish desired trajectories for the evaluation criterion C1 that has parameters λx and λK/B that weight errors between the desired trajectories of the non-linear system and the system outputs, and errors between the desired trajectories and the dynamic characteristics, are obtained. When the values of the parameters λx and λK/B can be adjusted, the priority in control of the system outputs and the dynamic characteristics can be changed.

When the degree of freedom of the control inputs of the non-linear system 2 is more redundant than the degree of freedom of the system outputs and the dynamic characteristics to be controlled, the new evaluation criterion C2 is added to the evaluation criterion C1 that obtains control inputs that accomplish the desired trajectories. Optimum control inputs corresponding to the evaluation criterion to which the new evaluation criterion C2 has been added can be obtained so as to control the non-linear system 2.

In FIG. 1, the calculating portion 1 can calculate control inputs that accomplish target paths using a forward system inner model in which many forward dynamics models that describe operations of the non-linear system 2 to be controlled are connected together.

The forward dynamics model is constructed of the dynamics calculating portion 1a corresponding to the dynamics of the non-linear system 2, and the dynamic characteristics calculating portion 1b corresponding to the dynamic characteristics to be controlled. The forward dynamics model controls the variation of the outputs and the dynamic characteristics of the present system corresponding to the system outputs and the control inputs from the previous unit of time.

The circuit in which many forward dynamics models are connected functions as the forward system inner model of the non-linear system 2. The circuit can internally calculate waveforms of the output and dynamic characteristics of the system corresponding to a waveform of a particular control input at particular time.

When desired trajectories for the outputs and dynamic characteristics of the system are assigned, the control apparatus performs the following steps so as to obtain control inputs that accomplish the target paths.

(1) Particular control inputs are assigned as initial values of the control inputs 3.

(2) The control inputs 3 are supplied to the forward system inner model of the calculating portion 1 so as to calculate paths of the outputs and the dynamic characteristics of the non-linear system 2 (forward calculation of the system).

(3) The comparators 4 calculate errors between the desired trajectories, the calculated outputs and errors between the desired trajectories and the dynamic characteristics. When the errors are satisfactorily small, the following step (7) is executed. When the errors are large, the next step (4) is executed.

(4) The errors against the target paths are propagated to the calculating portion 1 in the back-propagation direction of the conventional signal flow and the corrected amounts of the control inputs are calculated (inverse calculation).

(5) The control inputs 3 are updated corresponding to the corrected amounts of the control inputs obtained at step (4).

(6) From step (2), the process is repeated. (7) The obtained control inputs are supplied to the non-linear system 2.

(8) The calculation is finished.

When the apparatus according to the present invention operates according to the above-described steps, the value of an evaluation function defined by the errors between the target paths and the calculated paths decreases as the control inputs are updated. Thus, the control inputs that accomplish the target paths of the system outputs and the dynamic characteristics can be obtained.

If the dynamics of the non-linear system are unknown, when the relationship between the control inputs, the system outputs, and the dynamic characteristics is learned by a neural network, the dynamic calculating portion 1a that calculates the output corresponding to the dynamics of the non-linear system 2, and the dynamic characteristics calculating portion 1b that calculates the output corresponding to the dynamic characteristics to be controlled, can be constructed.

When the parameters λx and λK/B of the evaluation criterion C1 that calculates the corrected values are selected, the priority in control of the system outputs and the dynamic characteristics can be selected.

When the degree of freedom of the control inputs of the non-linear system 2 is more redundant than the degree of freedom of the system outputs and the dynamic characteristics to be controlled, the new evaluation criterion C2 is added to the evaluation criterion C1 for obtaining the control inputs that accomplish desired trajectories so as to obtain optimum control inputs corresponding to the resultant evaluation criterion and control the non-linear system 2.

As described above, for the non-linear system with dynamic characteristics that vary corresponding to control inputs, not only conventional system outputs, but dynamic characteristics of the system can be controlled according to their desired trajectories.

When a neural network that outputs dynamic characteristics of a non-linear system is used, even if dynamics of the non-linear system are unknown, dynamic characteristics of the non-linear system can be controlled to desired trajectories.

When dynamic characteristics of a non-linear system 2 are output using a neural network that has learned data at the above-described steps (a) to (c), even if dynamics of the non-linear system 2 are unknown, an inner model that generates outputs corresponding to dynamic characteristics of the non-linear system 2 can be obtained.

Since optimum control inputs that accomplish desired trajectories for an evaluation criterion C1 having parameters λx and λK/B that weight errors between desired trajectories of the non-linear system 2 and system outputs and errors between desired trajectories of the non-linear system 2 and dynamic characteristics are obtained and the values of the parameters λx and λK/B are adjustable, the priority in control of the system outputs and the dynamic characteristics can be changed.

When the degree of freedom of control inputs of the non-linear system 2 is more redundant than the degree of freedom of system outputs and dynamic characteristics to be controlled, a new evaluation criterion C2 is added to an evaluation criterion C1 for obtaining control inputs that accomplish target paths. Optimum control inputs for the resultant evaluation criterion are obtained so as to control the non-linear system 2. For example, a control criterion in which all control inputs are positive, a control criterion in which the variation of the control inputs is assigned as small a value as possible, or the like is assigned so as to control the non-linear system.

Next, an embodiment of the present invention will be described in detail.

Figure 2:
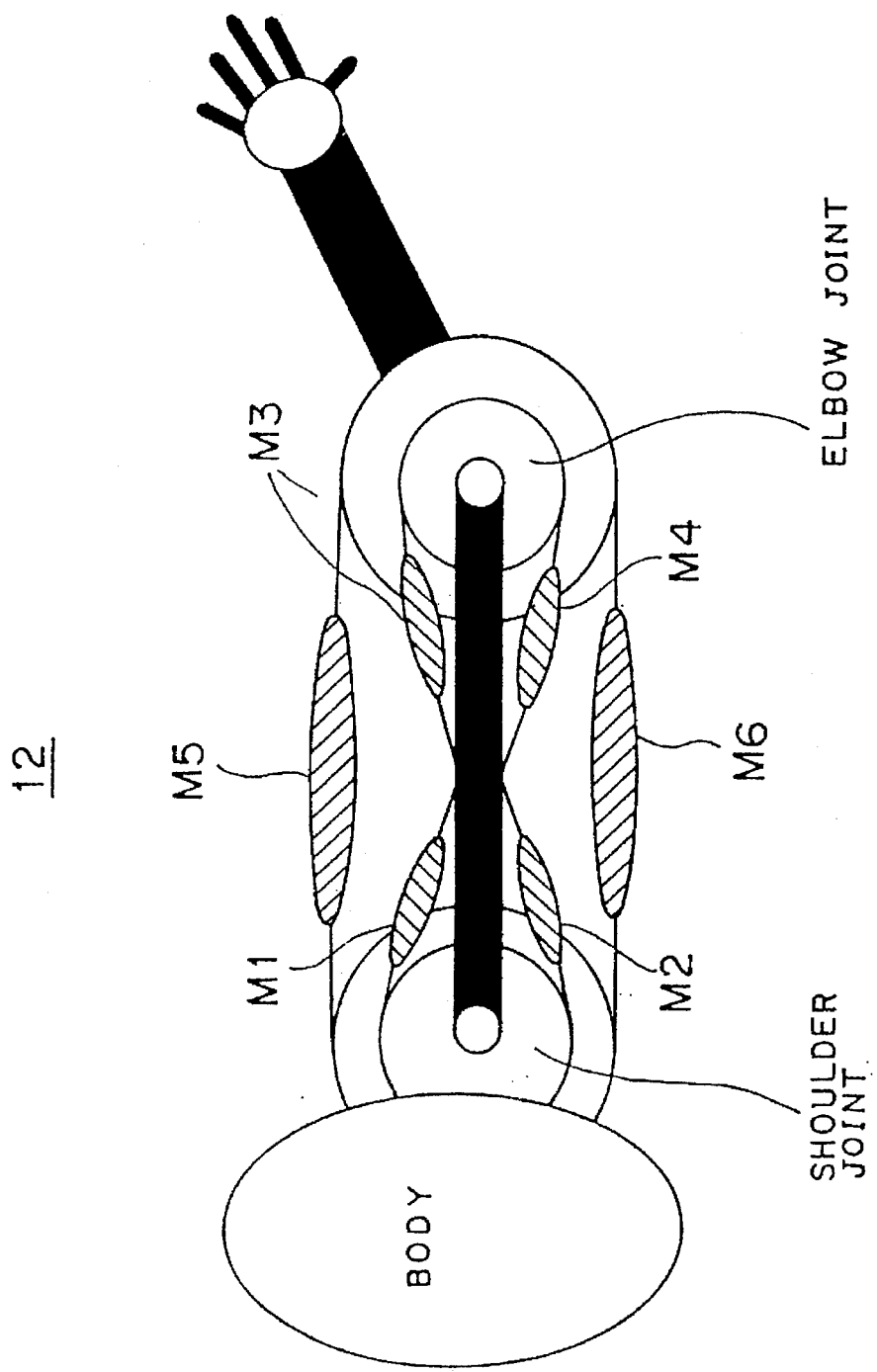
FIG. 2 is a schematic diagram showing a manipulator driven by artificial muscles.

FIG. 2 shows a manipulator to be controlled. In this embodiment, as shown in FIG. 2, the control of a manipulator having two joints that are driven by six artificial muscles will be described.

In FIG. 2, reference numeral 12 represents an artificial muscle type manipulator that has flexor muscles M1 and M3 and extensor muscles M2 and M4 that work for one joint and a flexor muscle M5 and an extensor muscle M6 that work for two joints. In this embodiment, the system outputs to be controlled are joint angles. The dynamic characteristics to be controlled are elastic characteristics and viscous characteristics of the artificial muscles of the manipulator.

Figure 3:
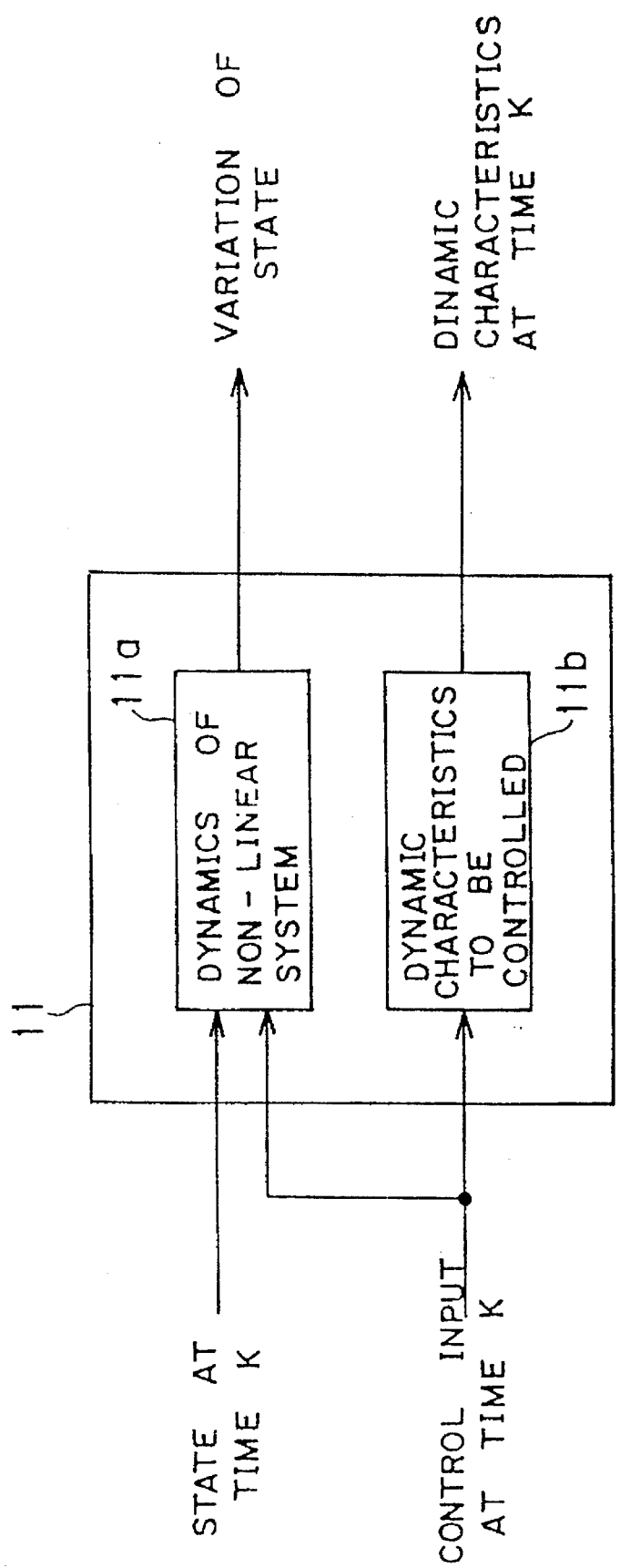
FIG. 3 is a schematic diagram showing a forward dynamic model of a non-linear system according to the present invention.
Figure 9:
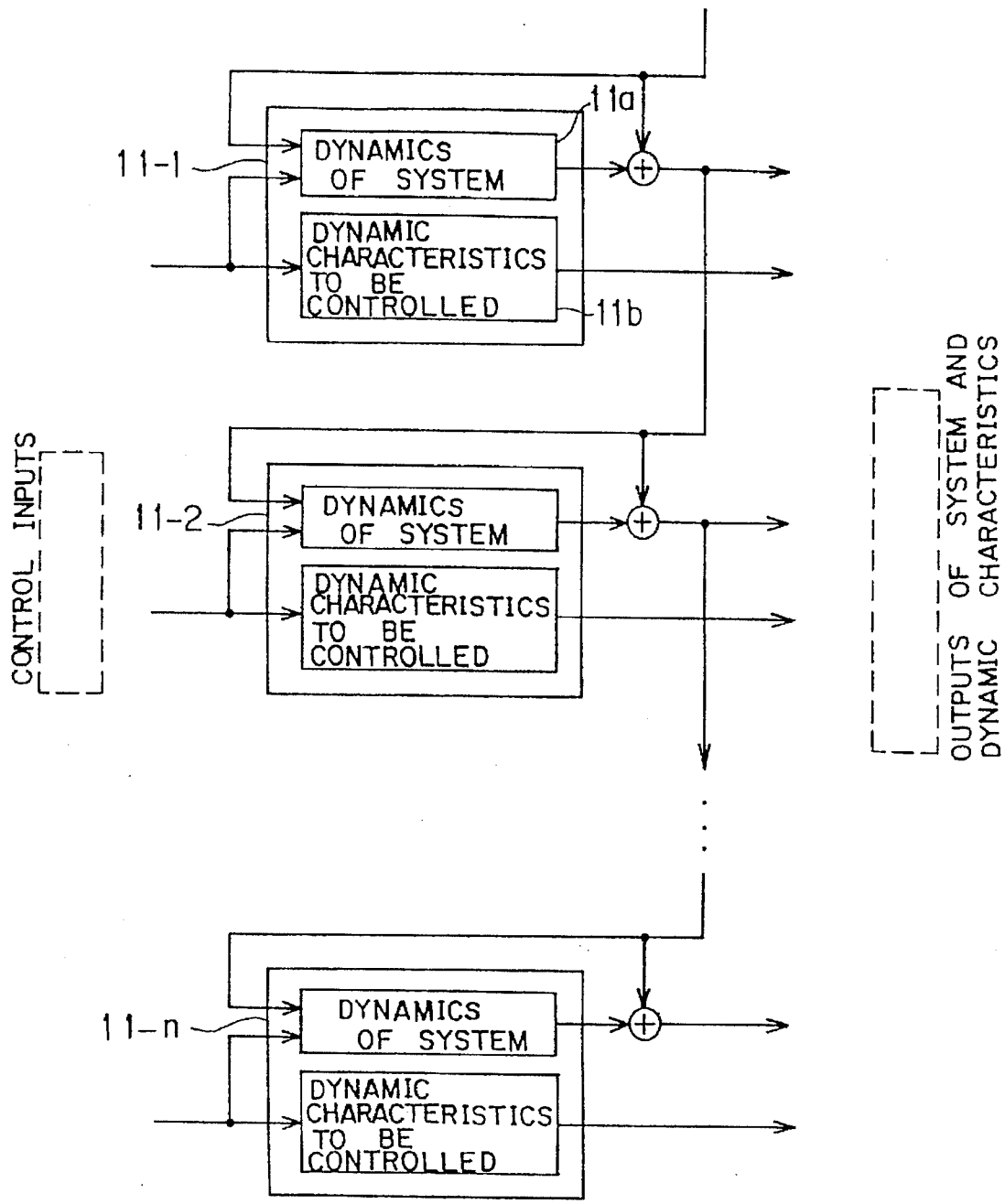
FIG. 9 is a schematic diagram for explaining the case that a plurality of forward dynamic models according to the present invention are connected.

FIG. 3 shows a forward dynamics model of a non-linear system such as an artificial muscle type manipulator that forms a control apparatus according to the embodiment. As will be described later, FIG. 9 shows a forward system inner model in which many forward dynamics models are cascade connected. In FIG. 9, since the same forward dynamics models are cascade connected, the forward dynamics model shown in FIG. 3 is hereinafter called a unit circuit.

As shown in FIG. 3, the unit circuit of the forward dynamic model is constructed of a portion 11a corresponding to dynamics of the non-linear system and a portion 11b corresponding to dynamic characteristics to be controlled.

The unit circuit 11 receives the state of the system and control inputs at time k and outputs the variation of the state and the dynamic characteristics.

In this embodiment, the portion corresponding to the dynamics of the non-linear system is the dynamics of the manipulator. The portion corresponding to the dynamic characteristics to be controlled is the viscous and elastic characteristics of the artificial muscles of the manipulator.

The unit circuit can be constructed in the following manner. (a) When the dynamics of the artificial muscle type manipulator are known, these dynamics can be used. (b) When the dynamics of the artificial muscle type manipulator are unknown, the dynamics can be learned by the neural network.

(a) In the case that the dynamics of the artificial muscle type manipulator are known:

Now, it is assumed that in the artificial muscle type manipulator shown in FIG. 2, the dynamics of an artificial muscle are represented by the following expression (1) and the torque of articulation τ that is produced in the artificial muscle is represented by the expression (2).

$$R(\theta)\theta'' + h(\theta, \theta') = \tau \quad (1)$$

$$\tau = Cu + B(u)\theta' + K(u)\theta \quad (2)$$

From the expressions (1) and (2), the dynamics of the artificial muscle type manipulator can be represented by the following expression (3).

$$R(\theta)\theta'' + h(\theta, \theta') = Cu + B(u)\theta' + K(u)\theta \quad (3)$$

The expression (1) provides general dynamics of the manipulator. R represents a 2×2 inertia matrix of the manipulator. h represents a non-linear function representing centrifugal force or Coriolis force. θ represents a two-dimensional vector of the joint angle. θ' represents a two-dimensional vector of the angular velocity of an articulation. θ'' represents a two-dimensional vector of the angular acceleration of an articulation. τ represents a two-dimensional vector of the torque of an articulation.

On the other hand, the expression (2) represents the torque of an articulation in the case that the dynamics of an artificial muscle is represented by the following expression (4) and the momentum of the muscle is constant irrespective of the joint angle.

$$f = u + ukx + ubx' \quad (4)$$

In the expression (2), C represents a 2×6 constant matrix. u represents a six-dimensional vector of an input to the artificial muscle. B(u) represents a 2×2 viscous characteristic matrix. K(u) represents a 2×2 elastic characteristic matrix. In the expression (4), f represents the tension of an artificial muscle. k and b represent the elastic constant and the viscous constant of an artificial muscle, respectively. x represents the displacement from the natural length of an artificial muscle. x' represents the velocity of the displacement. In x and x', the expanding direction is positive.

When the above-described artificial muscle type manipulator is controlled, the portion 11b corresponding to the dynamic characteristics to be controlled in the unit circuit shown in FIG. 3 calculates the values of matrices of the following expression (5) and outputs their values.

$$K=K(u), B=B(u) \tag{5}$$

On the other hand, the portion 11a corresponding to the dynamics of the non-linear system in the unit circuit 11 shown in FIG. 3 calculates the expression (6) corresponding to the expression (3) using the calculated results of the expression (5).

$$\begin{bmatrix} \Delta\theta \\ \Delta\theta' \end{bmatrix} = \Delta t \begin{bmatrix} \theta' \\ \theta'' \end{bmatrix} \tag{6}$$

$$= \Delta t \begin{bmatrix} \theta' \\ R^{-1}(\theta)[Cu + B\theta' + K\theta - h(\theta, \theta')] \end{bmatrix}$$

$$= F(u, \theta, \theta')$$

where $\Delta t$ represents predetermined sampling time (unit time). $\Delta\theta$ represents the variation of joint angle. $\Delta\theta'$ represents the variation of the angular velocity of a joint.

As described above, the unit circuit 11 receives the control input u to a muscle, the angle of joint $\theta$, and the angular velocity of joint $\theta'$ at present time, and outputs variation $\Delta\theta$ of the angle of joint, variation $\Delta\theta'$ of the angular velocity of joint, present elastic characteristic K, and present viscous characteristic B.

(b) In the case that the dynamics of the artificial muscle type manipulator are unknown:

When the dynamic characteristics of the manipulator and the artificial muscles is unknown, the dynamics can be learned by a hierarchical feed-forward type neural network.

Figure 4A:
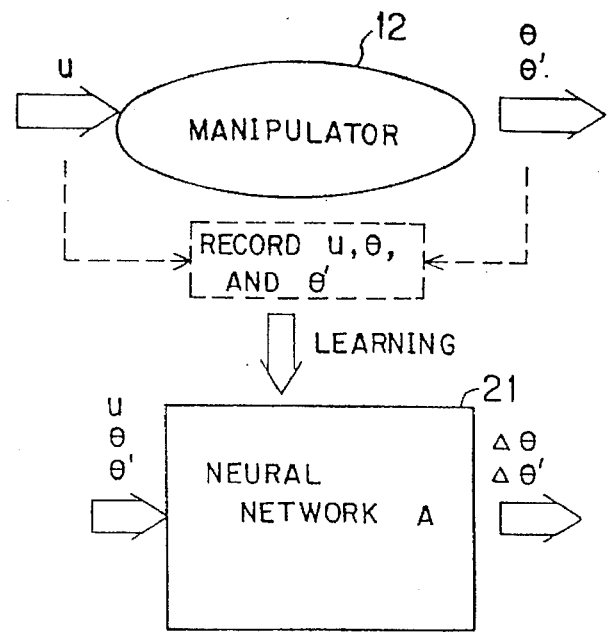
FIG. 4A is a schematic diagram for explaining a method for causing a neural network A to learn a portion corresponding to dynamics of the non-linear system.
Figure 4B:
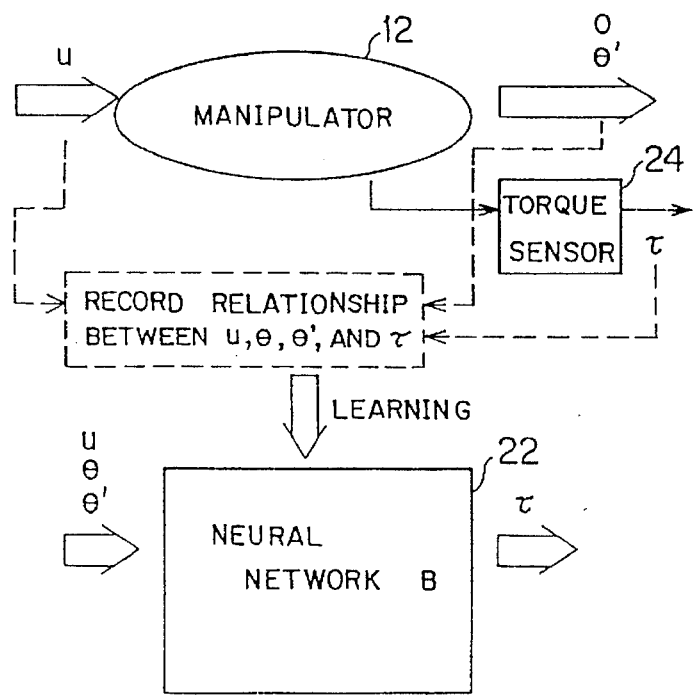
FIG. 4B is a schematic diagram for explaining a method for causing a neural network B to learn a portion corresponding to dynamic characteristics of the non-linear system.
Figure 5:
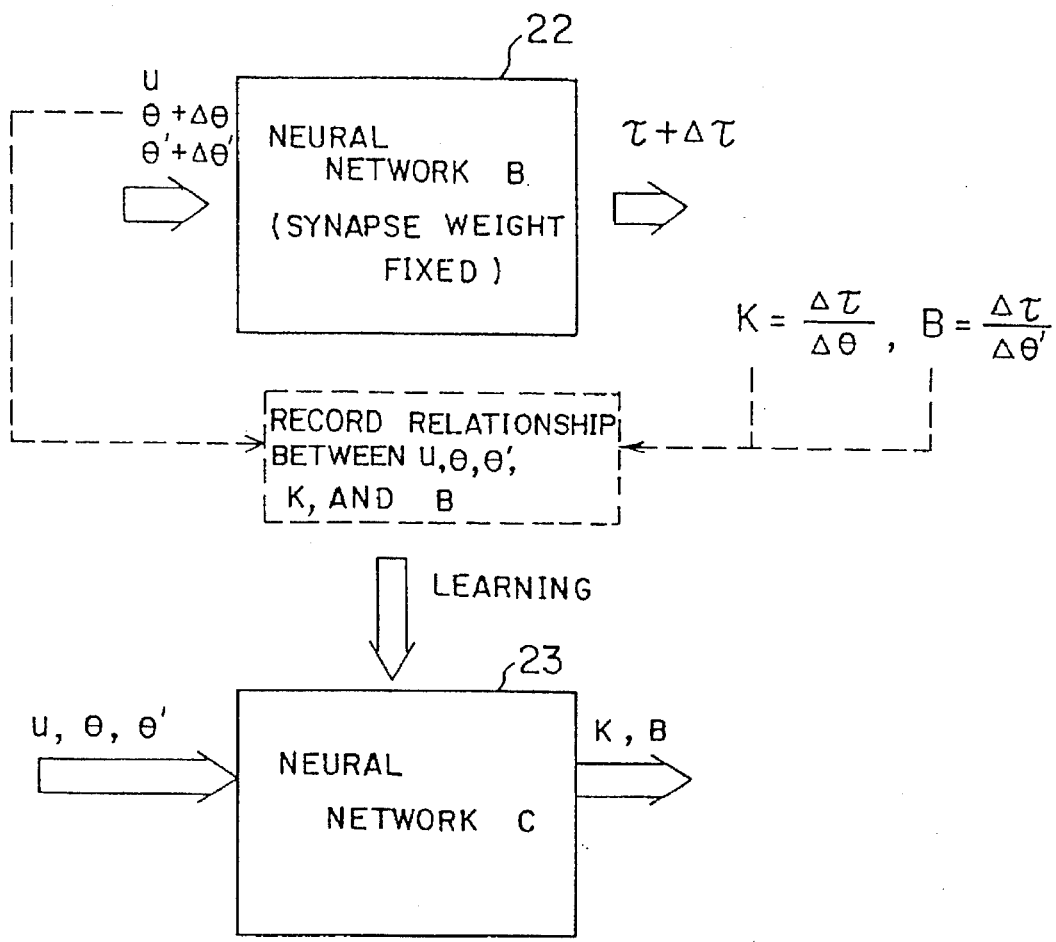
FIG. 5 is a schematic diagram for explaining a method for causing a neural network C to learn viscous and elastic coefficients of the non-linear system (No. 1)
Figure 6:
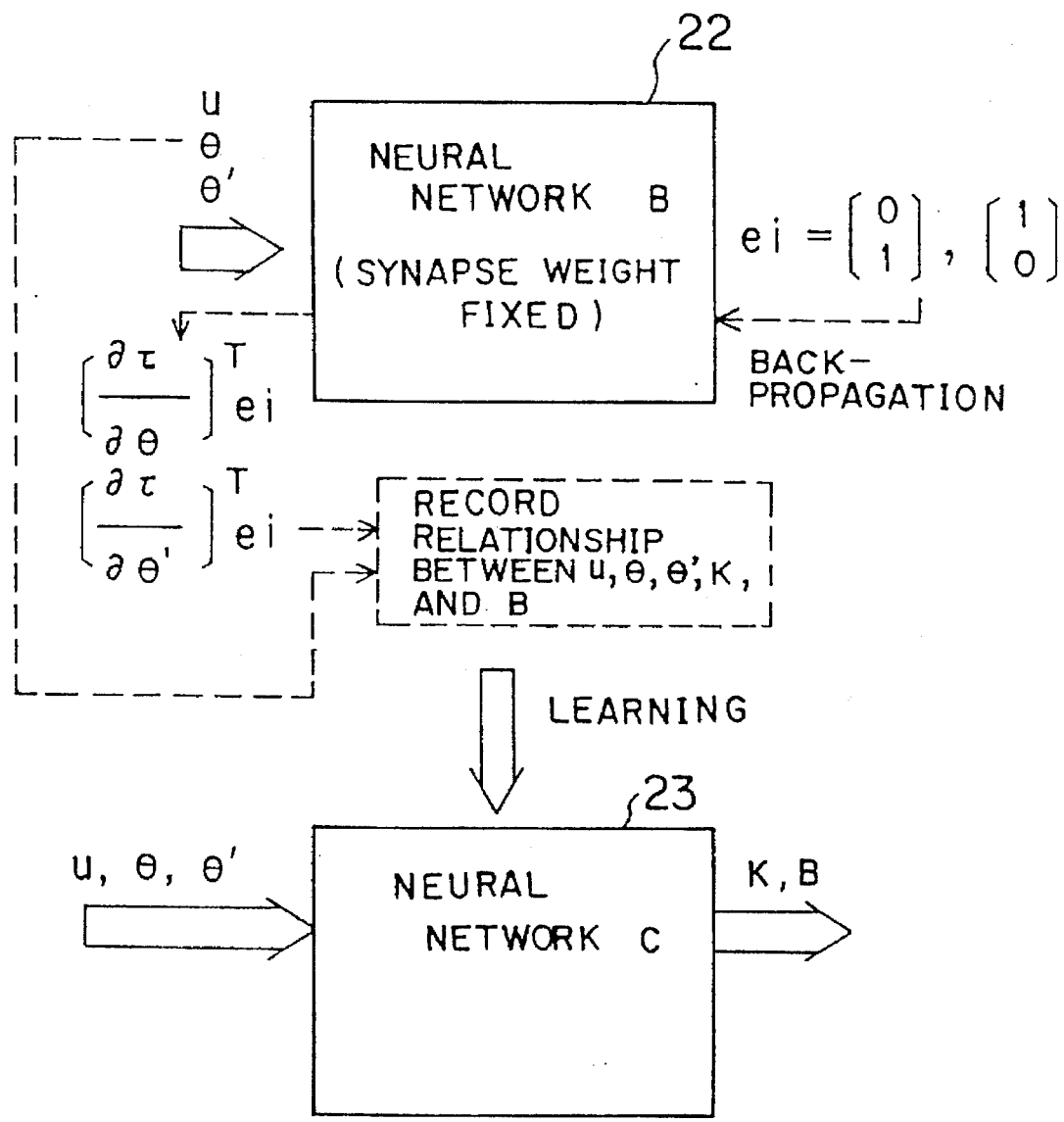
FIG. 6 is a schematic diagram for explaining the method for causing the neural network C to learn the viscous and elastic coefficients of the non-linear system (No. 2)

FIG. 4A shows the method for causing the neural network to learn the portion corresponding to the dynamics. FIGS. 4B, 5, and 6 show the method for causing the neural network to learn the portion corresponding to the dynamic characteristics.

To construct the portion corresponding to the dynamics of the artificial muscle type manipulator using the neural network, the relationship represented by the expression (6) is learned by the neural network.

(1) As shown in FIG. 4A, first the artificial muscle type manipulator 12 is operated and the control input u and the state (the angle of joint $\theta$ and the angular velocity of joint $\theta'$) are recorded.

(2) Next, the control input u is input. The angle of joint $\theta$ and the angular velocity of joint $\theta$ are sampled at a time interval $\Delta t$ so as to obtain variations $\Delta\theta$ and $\Delta\theta'$. A set of inputs of the neural network A 21 (the control input u, the angle of joint $\theta$, and the angular velocity of joint $\theta'$) and variations of outputs (the variation $\Delta\theta$ of angle of joint and the variation $\Delta\theta'$ of angular velocity) are treated as training (learning) data.

(3) The learning data of step (2) is learned by the neural network A 21 corresponding to the error back-propagation method as shown in FIG. 4A so as to obtain the relationship represented by the expression (6).

In the above-described steps, the relationship of expression (6) can be learned by the neural network A 21. The portion corresponding to the dynamics of the artificial muscle type manipulator 12 can be constructed of the neural network A 21.

Next, the error inverse propagation method will be described.

Now, it is assumed that the neural network is represented by z=N(w, x) and the neural network learns a function y=f(x), where z, x, and w are an output, an input, and a synapse weight of the neural network, respectively.

In the error back-propagation method, the corrected amount $\Delta w$ of the synapse load in which the value of the error function E represented by the following expression (7) decreases in proportion to the number of times of the correction of the synapse load, is calculated.

$$E = \frac{1}{2}(y-z)^\tau(y-z) \tag{7}$$

$$\frac{dE}{dt} = -(y-z)^\tau \frac{dz}{dt} \tag{8}$$

$$= -(y-z)^\tau \left(\frac{\partial z}{\partial w} \frac{dw}{dt} + \frac{\partial z}{\partial x} \frac{dx}{dt}\right) \leq 0$$

$$\Delta w = \epsilon \left(\frac{\partial z}{\partial w}\right)^\tau (y-z) \tag{9}$$

In other words, the corrected amount $\Delta w$ is calculated corresponding to the expression (9) so that the expression (8) is satisfied.

However, in the expression (7), to simplify the calculation, it is assumed that the number of learning data is one. t represents time denoting the number of times of correction. When the neural network learns data, x is a constant. Corresponding to the expression (9), in the error back-propagation method, the error between the true value y of the function and the output z of the neural network is inversely propagated by a transverse Jacobian so as to calculate the corrected amount of the synapse weight.

Next, a neural network that outputs viscous and elastic characteristics of an artificial muscle corresponding to the expression (5) is constructed. Now, it is assumed that a torque sensor 24 is provided at a joint of the manipulator 12 so as to measure the torque of the joint.

At this point, the torque of articulation $\tau$ applied to the articulation by the artificial muscle can be represented by the following expression (10) as a function of the control input u, the angle of joint $\theta$, and the angular velocity of articulation $\theta$. The elastic coefficient K and the viscous coefficient B of the artificial muscle are defined by the following expression (11) using the expression (10). It should be noted that the elastic coefficient K and the viscous coefficient B are Jacobians of the expression (10).

$$\tau = \tau(u, \theta, \theta') \tag{10}$$

$$K = \frac{\partial \tau}{\partial \theta}, B = \frac{\partial \tau}{\partial \theta'} \tag{11}$$

The neural network that obtains the elastic coefficient K and the viscous coefficient B of the artificial muscle corresponding to the control input u, the joint angle $\theta$, and the angular velocity of joint $\theta$, can be constructed by the following method as shown in FIGS. 4B and 5.

(1) As shown in FIG. 4B, a torque sensor 24 is provided at the articulation of the manipulator 12. The artificial muscle is operated. The relationship between (u, $\theta$, $\theta'$) and $\tau$ that is the value of the torque detected by the torque sensor 24 is recorded as learning data.

(2) Corresponding to the learning data at the step (1), the relationship of the expression (10) is learned by the neural network B 22 by the error back-propagation method or the like as shown in FIG. 4B.

(3) After the neural network B 22 has learned the relationship of the expression (10), (u, θ, θ') are input to the neural network B 22 with the synapse weight fixed so as to obtain the output τ.

(4) Next, (u, θ+Δθ, θ') are input to the neural network B 22 so as to obtain an output τ+Δτ. Using the input difference Δθ and the output difference Δτ, the elastic coefficient K=Δτ/Δθ is calculated.

(6) Likewise, (u, θ, θ'+Δθ') are input to the neural network B22 so as to obtain an output τ+Δτ. Using the input difference Δθ' and the output difference Δτ, the viscous coefficient B=Δτ/Δθ' is calculated.

(7) By repeating the above steps, the elastic coefficient K and the viscous coefficient B corresponding to various inputs (u, θ, θ') are obtained. Various set of the inputs (u, θ, θ') and outputs (K, B) of the neural network C 23 are formed as learning data. The learning data is learned by the neural network C 23 by the error back-propagation method or the like.

Thus, even if the dynamic characteristics of the artificial muscle type manipulator 12 are unknown, the portion corresponding to the dynamic characteristics can be constructed of the neural network C 23.

Next, another method for causing the neural network to learn the elastic coefficient K and the viscous coefficient B of an artificial muscle will be described.

A neural network that obtains the elastic coefficient K and the viscous coefficient B of the artificial muscle corresponding to the control input u, the joint angle θ, and the angular velocity of articulation θ', can be constructed by the following method as shown in FIGS. 4B and 6.

(1) As shown in FIG. 4B, a torque sensor 24 is provided at the joint of the manipulator 12. The artificial muscle is operated. The relationship between (u, θ, θ') and τ that is the value of the torque detected by the torque sensor 24 is recorded as learning data.

(2) Corresponding to the learning data at the step (1), the relationship of the expression (10) is learned by the neural network B 22 by the error back-propagation method or the like as shown in FIG. 4B.

(3) After the neural network B 22 has learned the relationship of the expression (10), while (u, θ, θ') are input to the neural network B 22 with the synapse weight fixed as shown in FIG. 6, an error ei is back-propagated to the input side of the neural network B 22 through the output side thereof.

The dimensions of the error ei are the same as those of the torque τ. For example, as shown in FIG. 6, the error ei is a vector in which only i-th element is 1. The error ei is a value necessary only for obtaining the relationship among (u, θ, θ'), the elastic coefficient K, and the viscous coefficient B. Thus, the error ei does not represent a real error.

Error signals back-propagated to the inputs (θ, θ') are represented by the following expression (12). The error signals correspond to the i-th row of the matrices that represent the elastic coefficient K and the viscous coefficient B of an artificial muscle.

$$\left(\frac{\partial \tau}{\partial \theta}\right)^\tau ei, \left(\frac{\partial \tau}{\partial \theta'}\right)^\tau ei \quad (12)$$

In other words, by calculating the expression (12) with respect to e1 to ei, the values of each row and each column of the elastic coefficient K and the viscous coefficient B can be obtained.

(4) The step (3) is performed for various (u, θ, θ') and ei (where i=1, 2). As shown in FIG. 6, the relationship among (u, θ, θ'), the elastic coefficient K, and the viscous coefficient B are recorded as learning data.

(5) The learning data is learned by the neural network C 23 by the error back-propagation method or the like as shown in FIG. 6. Thus, the neural network C 23 can obtain the relationship of the expression (11). In other words, the portion corresponding to the dynamic characteristics of the artificial muscle type manipulator 12 (the portion 11b shown in FIG. 3) can be constructed of the neural network C 23.

Next, with reference to FIG. 7, a first embodiment in which the single unit circuit shown in FIG. 3 that controls the artificial muscle type manipulator 12 will be described.

Figure 7:
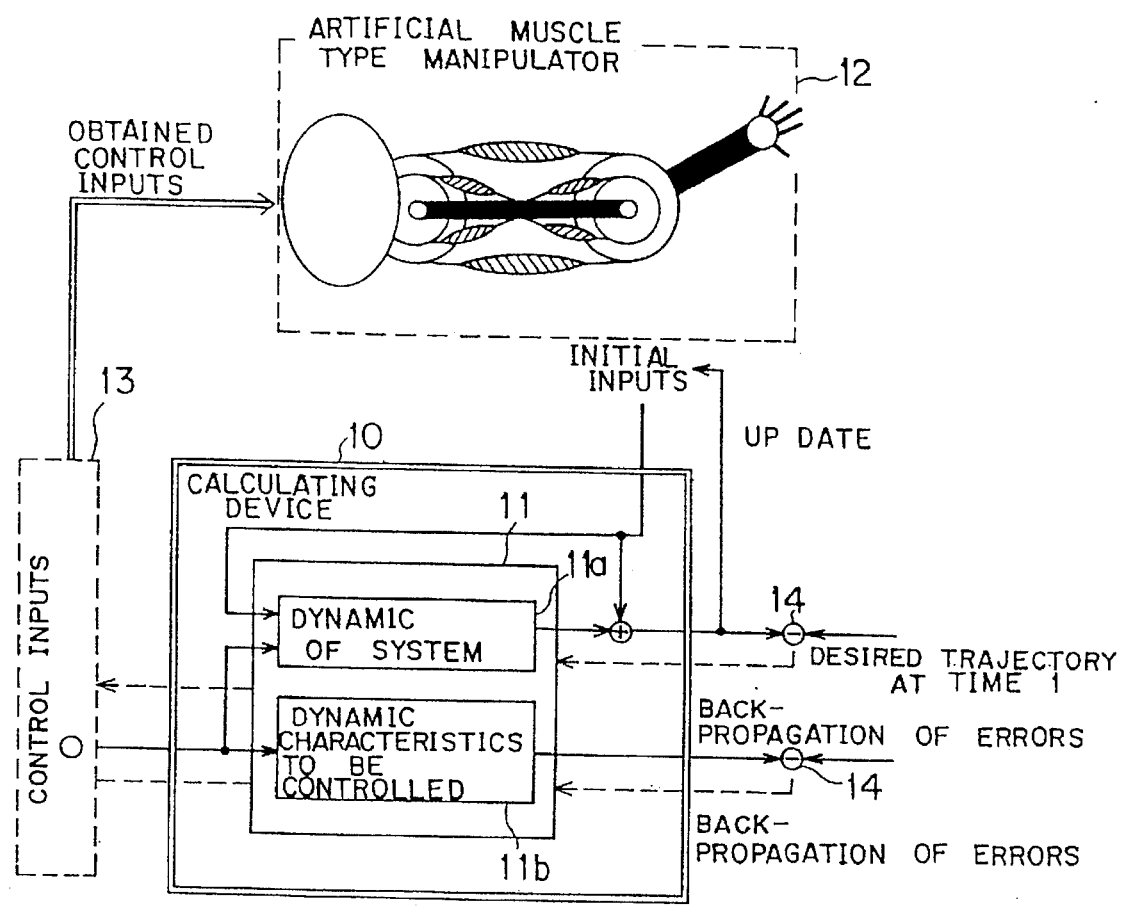
FIG. 7 is a schematic diagram showing an overall construction of a control apparatus according to a first embodiment of the present invention.

As shown in FIG. 7, the first embodiment comprises a calculating device 10, an artificial muscle type manipulator 12, control inputs 13, and comparators 14. The calculating device 10 is constructed of the single unit circuit. The construction of the artificial muscle type manipulator 12 is the same as that shown in FIG. 2. The comparators 14 compare trajectories that are output from the calculating device 10 at time i with desired trajectories at time i and obtains the errors thereof.

The control inputs at time i are calculated in the following manner. Now, it is assumed that $x_i$ represents output trajectories (θ, θ') at time i of the artificial muscle type manipulator 12, and that $u_i$ represents control inputs at time i.

(1) First, initial values $u_{i-1}$ of the control inputs 13 are supplied to the calculating device 10. When the preceding control inputs are updated, the initial values $u_{i-1}$ of the control inputs 13 are assigned so that they satisfy states $x_{i-1}^d$, $K_{i-1}^d$, and $B_{i-1}^d$ of the desired trajectories.

(2) Thereafter the next paths $x_i^d$, $K_i^d$, and $B_i^d$ of the artificial muscle type manipulator 12 at a later predetermined time are input to the comparators 14.

(3) Since the values of the control inputs u are the same as the initial values $u_{i-1}$, the control inputs are updated corresponding to the next target paths according to the following evaluation function (13).

$$C = \frac{1}{2} \sum_{i=0}^{n} \{\lambda_x (x_i - x_i^d)^\tau (x_i - x_i^d) + \quad (13)$$

$$\lambda_K (K_i - K_i^d)^\tau (K_i - K_i^d) + \lambda_B (B_i - B_i^d)^\tau (B_i - B_i^d)\}$$

When the value of the evaluation function is smaller than an assigned value, as described in the following step (7), the obtained control inputs are supplied to the artificial muscle type manipulator 12 to be controlled. On the other hand, when the value of the evaluation function is larger than the assigned value, the following step (4) is executed. In the expression (13), $\lambda_X$, $\lambda_K$, and $\lambda_B$ represent parameters that weight respective errors and assign the priority in control of the desired trajectories of the outputs and the viscous and elastic characteristics.

(4) The errors against the desired trajectories $(X_i-X_i^d)$, $(K_i-K_i^d)$, and $(B_i-B_i^d)$ are back-propagated in the circuit, in the inverse direction of the signal flow, so as to calculate corrected amounts $\Delta u_i$ of the control inputs.

(5) Corresponding to the corrected amounts $\Delta u_i$ of the control inputs obtained at step (4), $u_i+\Delta u_i$ is calculated so as to update the control inputs.

(6) From step (3), the process is repeated.

(7) The obtained control input is supplied to the artificial muscle manipulator 12 to be controlled.

(8) The initial inputs $x_{i-1}$ are updated to $x_i$ obtained at step (4). The desired trajectories are updated to $X_{i+1}$, $K_{i+1}$, and $B_{i+1}$. From step (2), the process is repeated.

Thus, using the preceding control inputs, control inputs corresponding to the next desired trajectories are obtained. By successively inputting the obtained control inputs to the artificial muscle manipulator 12, the desired trajectories can be obtained.

Figure 8:
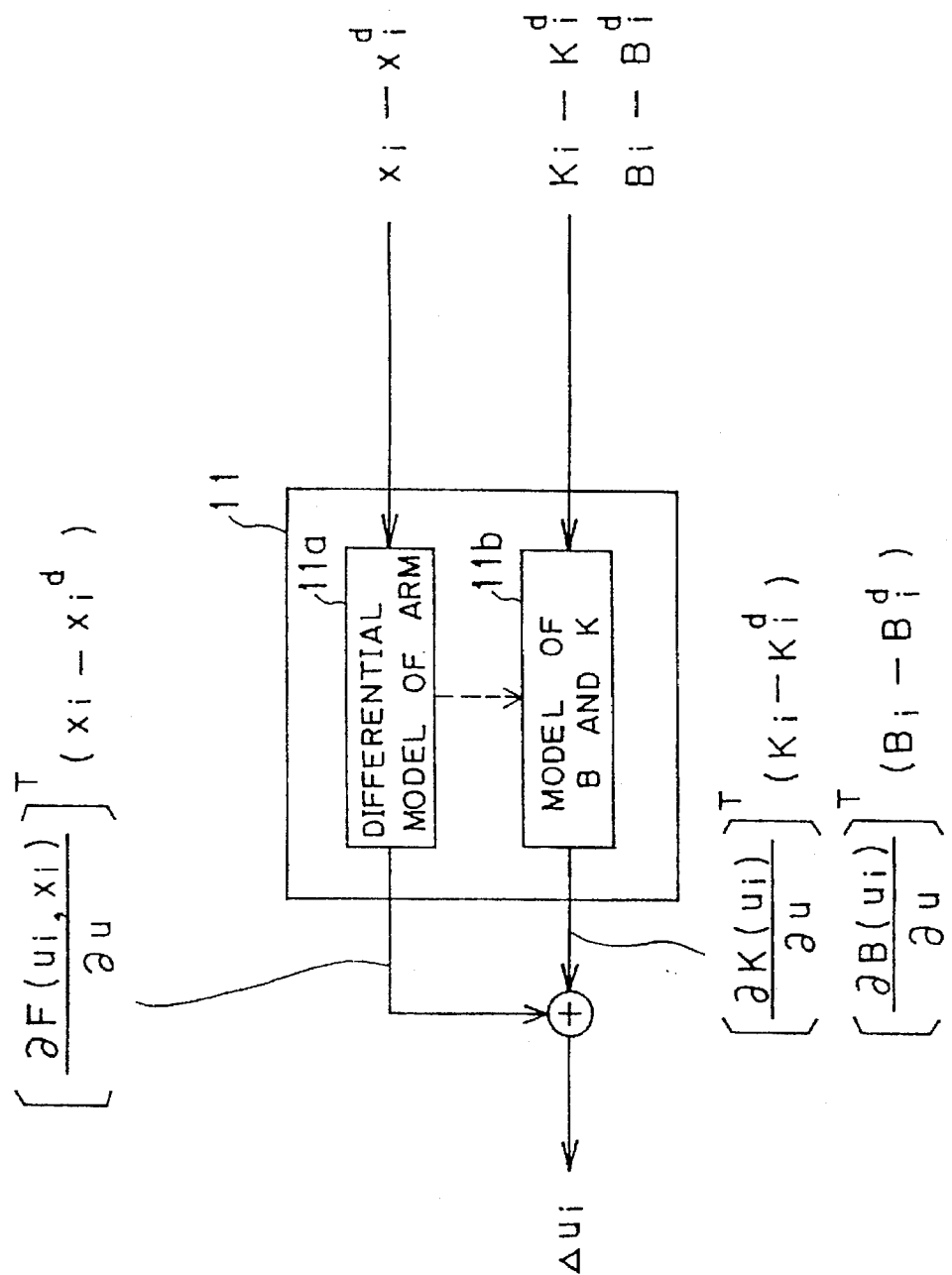
FIG. 8 is a schematic diagram for explaining an error back-propagation according to the first embodiment.

FIG. 8 is a schematic diagram showing an error back-propagation according to the first embodiment.

When errors $(X_i-X_i^d)$, $(K_i-K_i^d)$, and $(B_i-B_i^d)$ are back-propagated to the unit circuit 11, corrected amounts $\Delta u_i$ corresponding to the control inputs $u_i$ are obtained as shown in FIG. 8.

Next, a forward system inner model according to a second embodiment will be described.

As shown in FIG. 9, the forward system inner model to be controlled is constructed by connecting a plurality of unit circuits shown in FIG. 3. In this embodiment, N unit circuits 11-1 to 11-n are connected, where N is a sufficiently large number.

Figure 10:
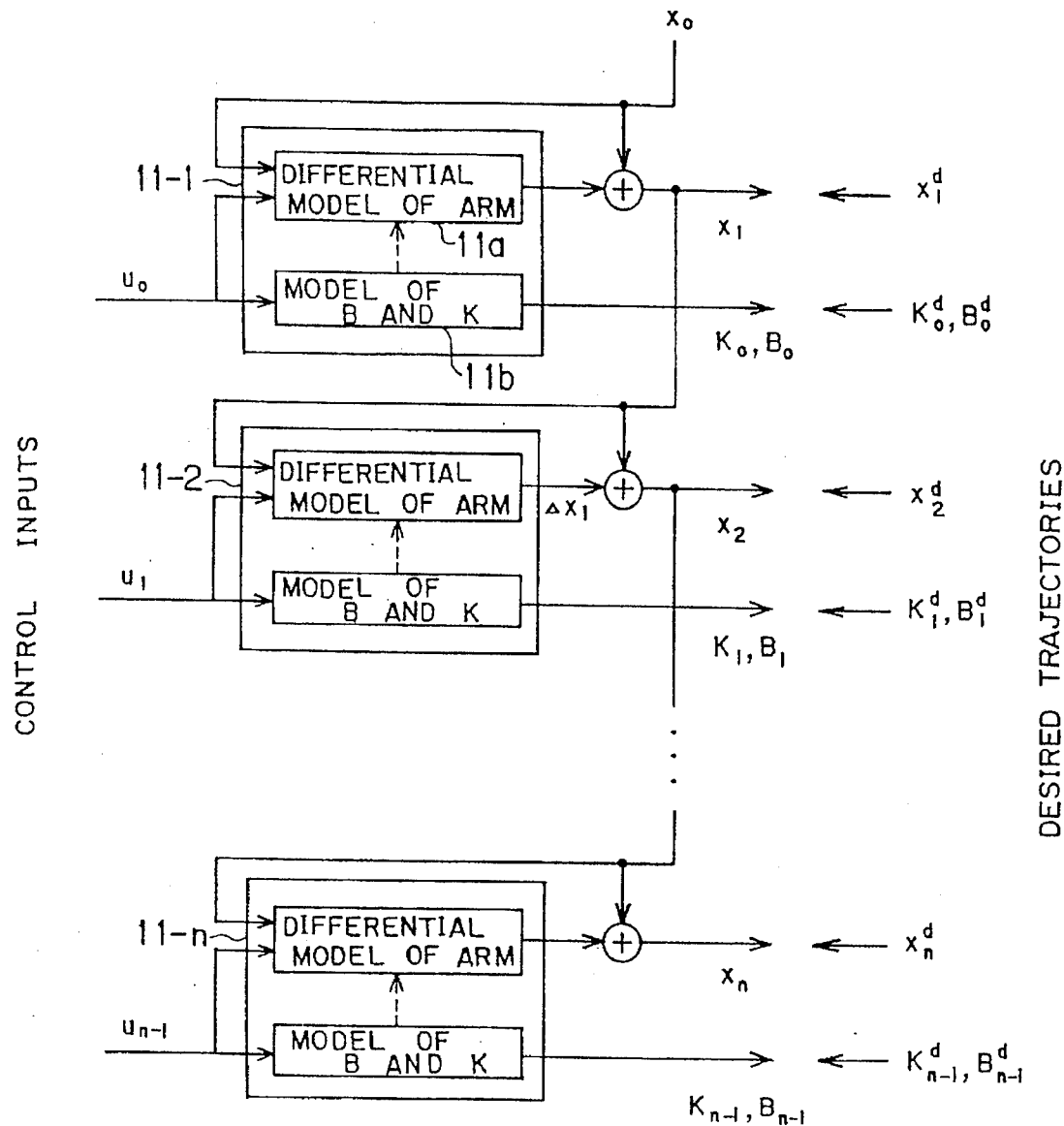
FIG. 10 is a schematic diagram for explaining the case that a plurality of forward dynamic models according to the present invention are connected so as to provide desired trajectories.

In FIG. 10, an i-th unit circuit 11-1 accords with i-th time discrete with a predetermined sampling interval $\Delta t$. When the operating time of desired trajectories is T, only n of N unit circuits are used (where $n=T/\Delta t < N$).

Reference letters shown in FIG. 10 are defined as follows.

$u_0, u_1, \ldots, u_{n-1}$: Discrete trajectory of the control input u with the sampling interval $\Delta t$.

$X_0, X_1, \ldots, X_n$: Discrete trajectory of the output (angle of articulation and angular velocity of articulation: $x=[\theta, \theta']^T$).

$K_0, K_1, \ldots, K_{n-1}, B_0, B_1, \ldots, B_{n-1}$: Discrete trajectories of the elastic characteristic K and viscous characteristic B. Although K and B are 2×2 matrices, they are represented as vectors for simplicity.

Since the unit circuits 11-1 to 11-n calculate the expressions (5) and (6) or the expressions (6) and (11), when they are connected as shown in FIG. 10, the outputs at a particular time (the angle of joint and the angular velocity of joint) and variations are added so as to calculate the outputs for the next time. Thus, the entire forward system can calculate the output paths $X_0, X_1, \ldots, X_n$ and the trajectories of dynamic characteristics $K_0, K_1, \ldots, K_n$ and $B_0, B_1, \ldots, B_n$ corresponding to the trajectories $u_0, u_1, \ldots, u_n$ of the control inputs.

Figure 11:
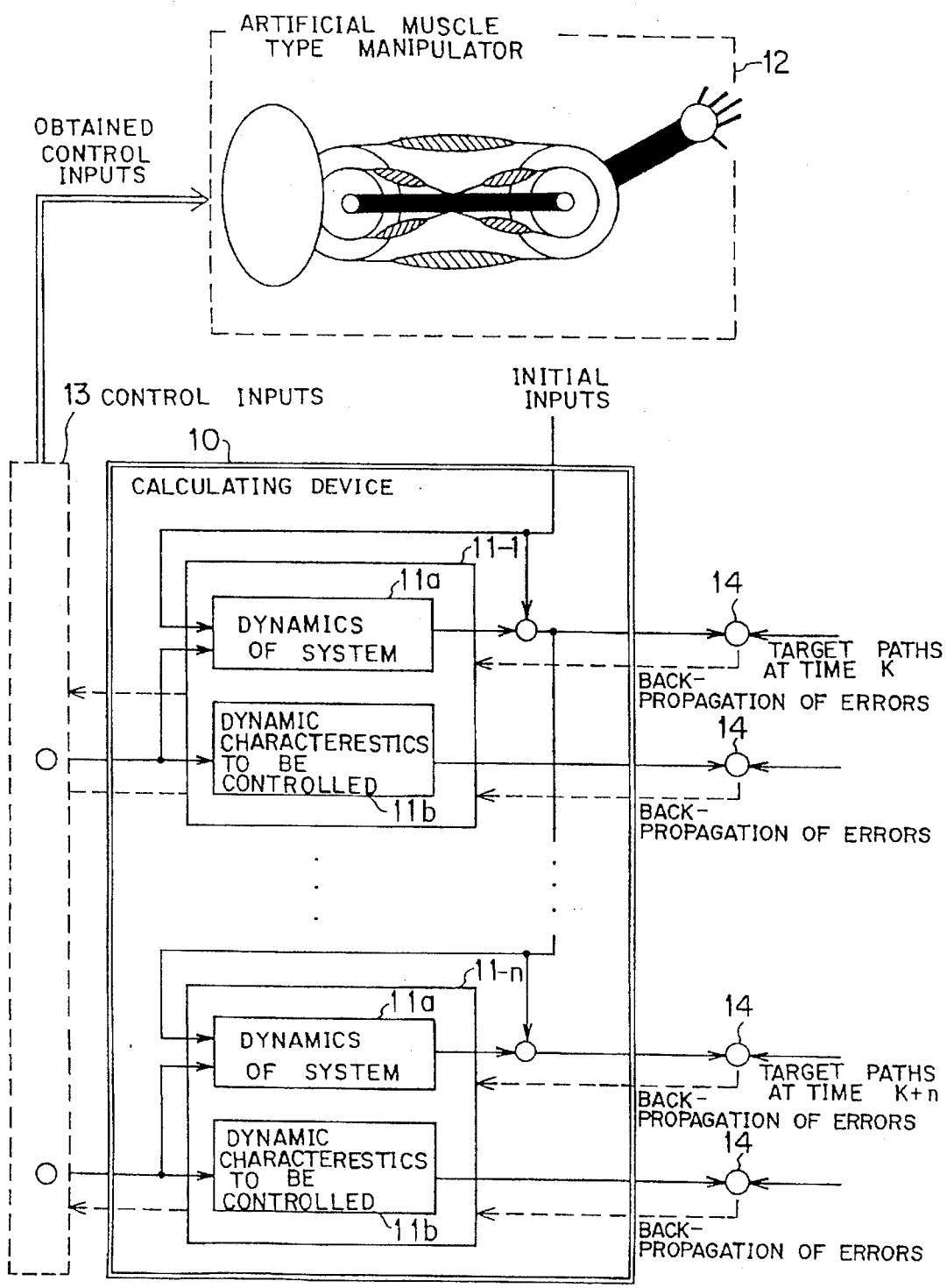
FIG. 11 is a schematic diagram showing an overall construction of a control apparatus according to a second embodiment of the present invention.

FIG. 11 is a schematic diagram showing the entire construction of the control apparatus according to the second embodiment. In FIG. 11, reference numeral 10' is a calculating device that is the forward system inner model (see FIG. 10) constructed by connecting a plurality of unit circuits 11. Reference numeral 12 is an artificial muscle type manipulator as shown in FIG. 2. Reference numeral 13 is control inputs. Reference numeral 14 are comparators that compare trajectories at each time that are supplied from the calculating device 10' with target paths at each time, and obtain the errors thereof.

In FIG. 11, the errors of paths at each time obtained by the comparators 14 are back-propagated to the calculating device 10'. The calculating device 10' repeats the process, obtains control inputs that can accomplish desired trajectories at each time, outputs the control inputs to the artificial muscle type manipulator 12, and thus controls it.

When the desired trajectories $X_i^d$ (where $i=0, 1, \ldots, n$), $K_i^d$, and $B_i^d$ (where $i=0, 1 \ldots, n$) are assigned for the system outputs $X_i$ (where $i=0, 1, \ldots, n$), and dynamic characteristics $K_i$ and $B_i$ (where $i=0, 1, \ldots, n$) corresponding to the forward inner model shown in FIG. 10, the calculating device 10' shown in FIG. 11 can calculate the control inputs to the artificial muscle type manipulator 12. The control inputs are updated in the following manner.

(1) As initial values of the control inputs, particular control inputs $u_i$ (where $i=0, 1, \ldots, n$) are assigned so that they satisfy initial states $X_0^d$, $K_0^d$, and $B_0^d$ of the target paths.

(2) The control inputs $u_i$ (where $i=0, 1, \ldots, n$) are supplied to the forward system inner model so as to calculate the output paths (the angle of articulation and the angular velocity of articulation) $x_i$ (where $i=0, 1, \ldots, n$) of the artificial muscle type manipulator 12 and the paths of viscous and elastic characteristics $K_i$ and $B_i$ (wherein $i=0, 1, \ldots, n$).

(3) An evaluation function C that evaluates errors between the output path $X_i$ (where $i=0, 1, \ldots, n$), the paths of viscous and elastic characteristics $K_i$, $B_i$ (where $i=0, 1, \ldots, n$) that are calculated at the step (2), and the target paths $X_i^d$, $K_i^d$, and $B_i^d$ (where $i=0, 1, \ldots, n$) is calculated according to the expression (13).

When the value of the evaluation function is smaller than an assigned value, as will be described in the following step (7), the obtained control inputs are supplied to the artificial muscle manipulator 12 to be controlled. When the value of the evaluation function is larger than the assigned value, the following step (4) is executed.

Note that in the expression (13), $K_i$ and $B_i$ are represented by vectors. $\lambda_X$, $\lambda_K$, and $X_B$ are parameters that weight their errors and assign the priority in control of the target paths of the outputs and viscous and elastic characteristics.

(4) The errors $(X_i-X_i^d)$, $(K_i-K_i^d)$, and $(B_i-B_i^d)$ (where $i=1, 2, \ldots, n$) against the desired trajectories are back-propagated in the circuit, in the inverse direction of the signal flow, so as to calculate corrected amounts $\Delta u_i$ (where $i=0, 1, \ldots, n$) of the control inputs. The method of the error back-propagation and the calculation of corrected amounts will be described in detail later.

(5) $u_i + \Delta u_i$ is calculated corresponding to the corrected amounts $\Delta u_i$ (where $i=0, 1, \ldots, n$) of the control inputs obtained at step (4) so as to update the control inputs.

(6) From the step (2), the process is repeated.

(7) The obtained control inputs are supplied to the artificial muscle type manipulator 12 to be controlled.

(8) The calculation is finished.

Since the apparatus according to the second embodiment operates as described above, the value of the evaluation function C decreases as the control input is updated. Thus, the control inputs in which trajectories of the system outputs and the dynamic characteristics are target paths can be obtained.

Figure 12:
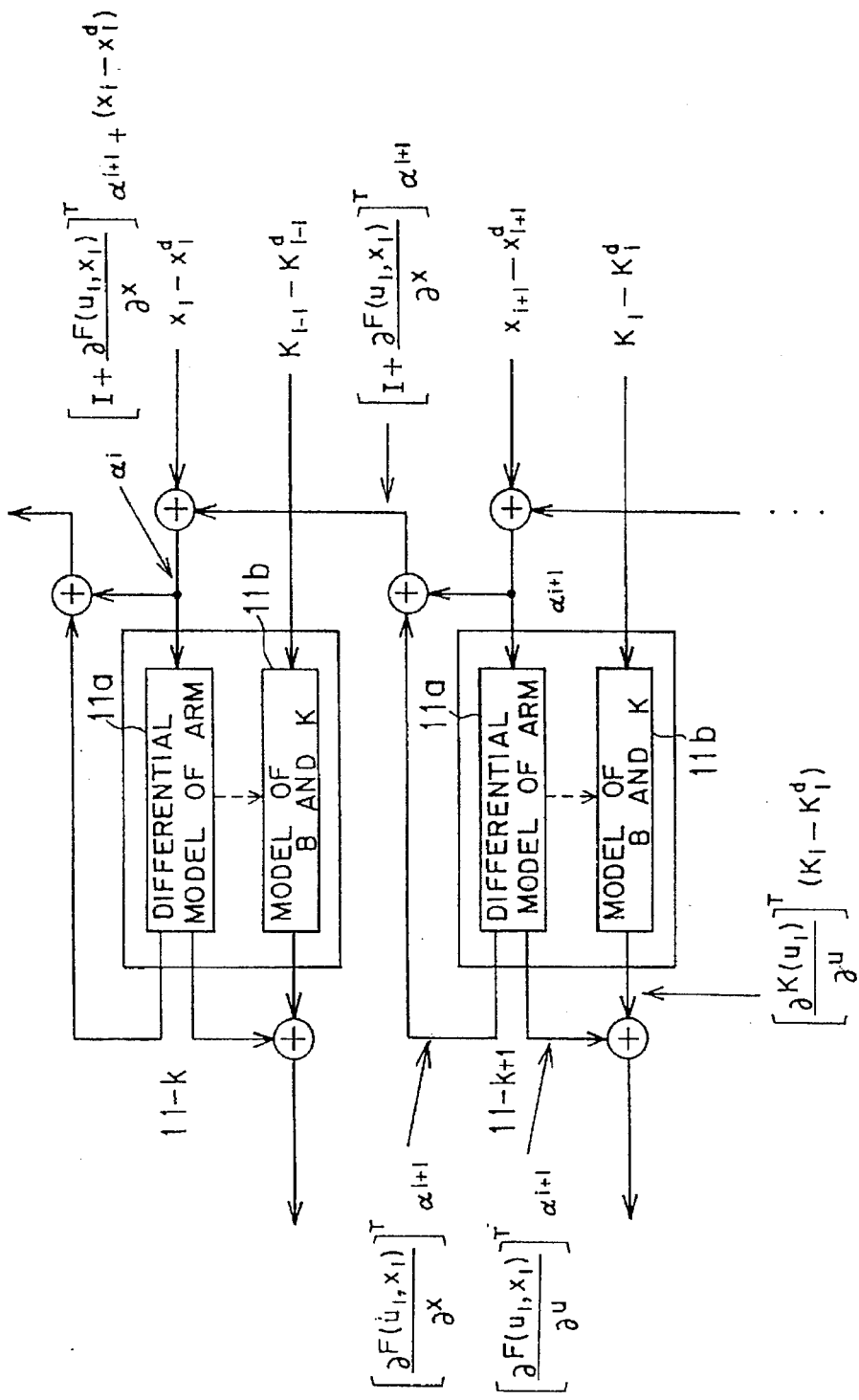
FIG. 12 is a schematic diagram for explaining an inverse propagation of an error according to the second embodiment.

FIG. 12 is a schematic diagram showing an error back-propagation according to the second embodiment. In FIG. 12, reference numerals 11-k and 11-k+1 represent inner model unit circuits.

As shown in FIG. 12, errors $(X_1-X_i^d)$, $(K_i-K_i^d)$, and $(B_i-B_i^d)$ (where $i=1, 2, \ldots, n$) of the calculated paths against target paths are inversely propagated in the inverse direction in the circuit. When the errors are inversely propagated, the constructional elements of the circuit operate as follows.

Blocks: Blocks work as transverse Jacobians of functions. For example, when a block is a function that receives an input x and outputs a f(x), and if an error $\delta$ flows in the inverse direction, the block outputs the following expression (14).

$$\left( \frac{\partial f(x)}{\partial x} \right)^\tau \delta \qquad (14)$$

Branch points of forward signals: Error signals are merged and added.

Merge points of forward signals: Error signals are branched.

When error signals inversely flow in each constructional element of the circuit, the error signals can be represented by the following expressions (15) and (16)

$$\alpha_i = \left[ I + \frac{\partial F(u_i, x_i)}{\partial x} \right]^\tau \alpha_{i+1} + (x_i - x_i^d) \quad (15)$$

(where $i = 0, 1, \ldots, n - 1$)

$$\zeta_i = \lambda_x \left[ \frac{\partial F(u_i, x_i)}{\partial u} \right]^\tau \alpha_{i+1} + \quad (16)$$

$$\lambda_X \left[ \frac{\partial K(u_i)}{\partial u} \right]^\tau (K_i - K_i^d) +$$

$$\lambda_B \left[ \frac{\partial B(u_i)}{\partial u} \right]^\tau (B_i - B_i^d)$$

In the expressions (15) and (16), $\alpha_i$ represents a resultant error signal in which output path errors at time i or later of the system are inversely propagated to a unit circuit corresponding to time i. $\zeta_i$ represents an error signal that is inversely propagated to the control input $u_i$ at time i. Function F(x) is defined by the expression (6).

The corrected amounts of the control inputs are calculated according to the following expression (17). The control inputs are updated with $u_i + \Delta u_i$.

$$\Delta u_i = -\epsilon \zeta_i \quad (17)$$

where $\epsilon$ of the expression (17) is a positive constant.

When the control inputs are updated as described above, the value of the evaluation function C decreases as the control inputs are updated. When the value of the evaluation function C becomes a minimum, the optimum control inputs corresponding to the evaluation function C can be obtained.

When the desired trajectories can be accomplished, the minimum value of the evaluation function C is zero. Thus, the control inputs that accomplish the desired trajectories can be obtained. When the target paths cannot be accomplished due to an insufficient degree of freedom of the control inputs, control inputs that can accomplish as close the desired trajectories as possible can be obtained. In this case, by selecting the parameters $\lambda_X$, $\lambda_K$, and $\lambda_B$, the priority of the output paths and paths of viscous and elastic characteristics can be assigned.

As described above, when the relationship of the expressions (6) and (11) is learned by the neural network, and the forward system inner model is constructed of a plurality of unit circuits, the expressions (15) and (16) can be used as they are.

Since the error back-propagation learning method of the neural network is equivalent to the operation in which a transverse Jacobian of a function to be learned is applied to an error, when the conventional error back-propagation is performed with the synapses load fixed, the expressions (15) and (16) can be executed as they are.

In the second embodiment, an example in which the error signals inversely flow in the forward system was described. However, in addition to the forward system inner model, an independent circuit that transmits errors can be provided. In this case, the construction of this circuit is the same as the construction of the above-described circuit.

In the control apparatus according to the present invention, when the degree of freedom of the control inputs is larger than the degree of freedom of the variables to be controlled, optimum control inputs for a newly added evaluation criterion can be obtained using the remaining control inputs. In contrast, when the degree of freedom of the control inputs is insufficient, control inputs that decrease the value of the evaluation function, such as the expression (13), can be obtained.

In the manipulator with six muscles and two joints, the degree of freedom of the control inputs is six. The degree of freedom of the angles of articulations is two. The degree of freedom of both the elastic matrix and viscous matrix is three (because the elastic matrix and the viscous matrix are diagonal matrices).

Thus, when the angles of articulations are always controlled, since the degree of freedom of the control inputs is insufficient, both the elastic matrix and the viscous matrix cannot be completely controlled at the same time. Now, it is assumed that only the elastic matrix is controlled and the viscous matrix is not controlled.

In this case, since the degree of freedom of the outputs is five in total, the control inputs are redundant for one degree of freedom. Using the degree of freedom of the remaining control inputs, optimum control inputs for a newly added evaluation criterion can be obtained.

As a new evaluation criterion, for example, a control criterion in which all control inputs are positive is assigned and defined by the following expression (18).

$$C_1 = \begin{cases} 0, \text{ if } u_i \geq u_{ref} \\ \frac{1}{2} \sum_{i=0}^{n} (u_i - u_{ref})^\tau (u_i - u_{ref}), \text{ if } u_i < u_{ref} \end{cases} \quad (18)$$

In the expression (18), $u_{ref}$ is a constant that requires the values of the control inputs to be larger than $u_{ref}$. To cause the control inputs to be positive, the relationship of $u_{ref} \geq 0$ should be satisfied. At this point, $C_1$ that is weighted by $\lambda_1$ is added to the evaluation function C of the expression (13), and the entire evaluation function $C_T$ represented by the following expression (19), is defined.

$$C_T = C + \lambda_1 C_1 \quad (19)$$

where $\lambda_1$ is a positive constant and $\lambda_B$ of the evaluation function C is zero.

When the corrected amounts of the control inputs are calculated by the following expressions (20) and (21), and the control inputs are updated with $u_i + \Delta u_i$, the value of the evaluation function $C_T$ decreases as the control inputs are updated. When the target paths can be accomplished with positive control inputs, the minimum value of the evaluation function $C_T$ is zero.

When the corrected amounts of the control inputs are updated corresponding to the expression (20), desired control inputs can be obtained.

$$\Delta u_i = -\epsilon \{\zeta_i + \delta_i\} \quad (20)$$

$$\delta_i = \begin{cases} 0, \text{ if } u_i \geq u_{ref} \\ (u_i - u_{ref}), \text{ if } u_i < u_{ref} \end{cases} \quad (21)$$

As another control criterion, the variations of control inputs should be as small as possible. Instead of controlling the entire elastic matrix, part of the elastic matrix and part of the viscous matrix may be controlled at the same time.

In any case, when a proper evaluation function is assigned, control inputs can be obtained by the above-described method.

In the above-described embodiment, the desired trajectories of joint angles are given as coordinates of joint angles so as to control the elastic characteristics and viscous characteristics of the articulations. However, instead of coordinates of angles of articulations, the elastic characteristic and viscous characteristic can be controlled as coordinates of the end-point of the manipulator.

Figure 13:
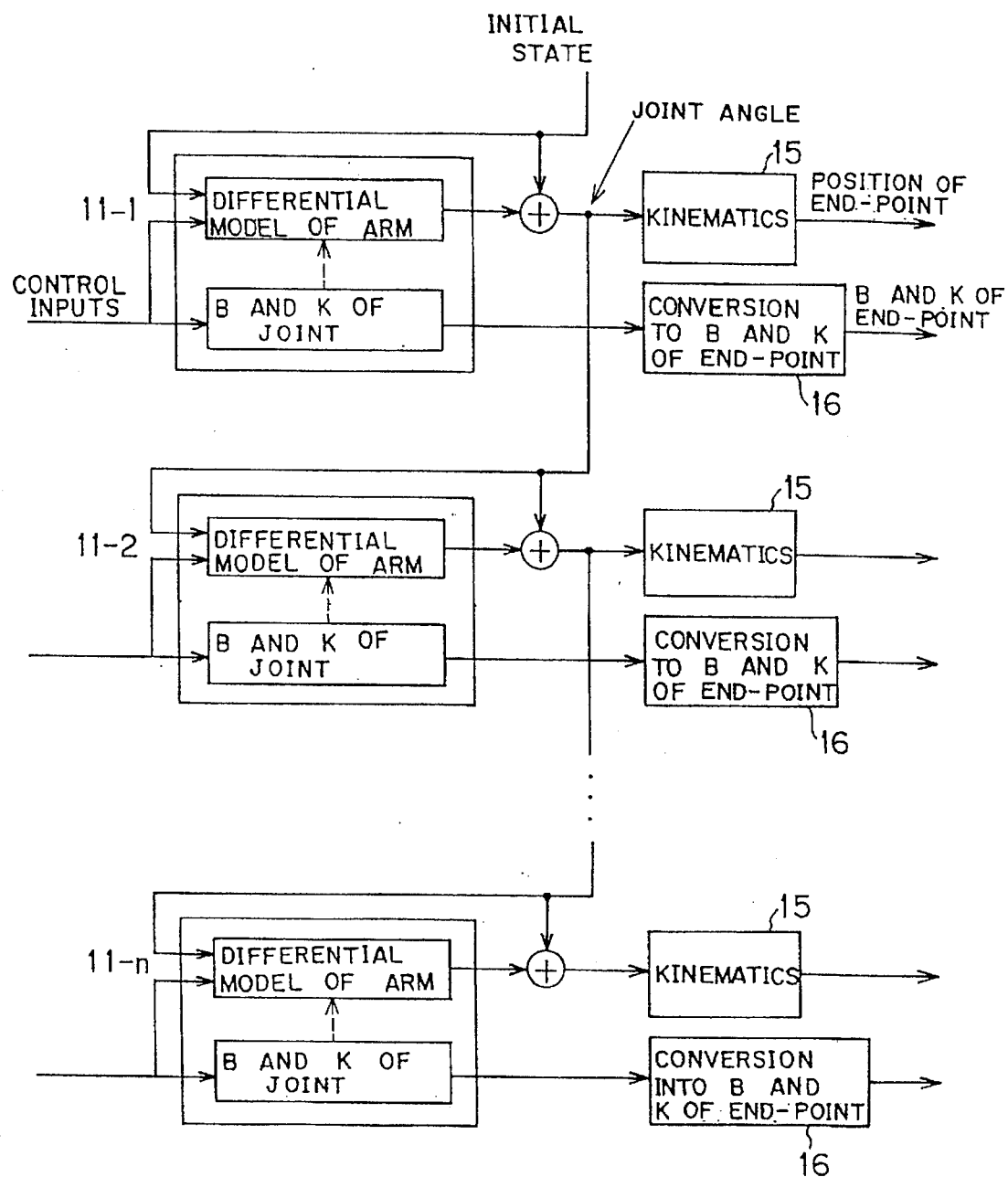
FIG. 13 is a schematic diagram for explaining the case that the control apparatus according to the second embodiment is controlled by end-point coordinates.

FIG. 13 is a schematic diagram showing an embodiment in which the elastic characteristic and viscous characteristic are controlled as coordinates of the end-point of the manipulator. In this embodiment, converting portions 15 and 16 are provided on the output side of the forward system inner model shown in FIG. 10. The converting portion 15 (kinematically) converts joint angles into coordinates of the end-point. The converting portion 16 converts the viscous and elastic characteristics of the articulations into viscous and elastic characteristics of the end-point.

As shown in FIG. 13, when the manipulator is controlled by the coordinates of the tip, such coordinate conversions are required. However, the forward system inner model shown in FIG. 10 can be used for the end-point coordinates. In this case, only the converting portions that perform the kinematics conversion and conversions for viscous and elastic characteristics are added to the output side of the forward system inner model. In this case, the propagation method of the error signals is the same as that in the above-described embodiment.

To verify the validity of the control apparatus according to the second embodiment, simulation experiments were performed. In these experiments, the manipulator shown in FIG. 2 was controlled.

It was assumed that the dynamics of the manipulator could be represented by the expression (3). The parameters of the manipulator and artificial muscles are as follows:

|  | Mass | Length | Distance to Center of Mass | Moment of Inertia |
|---|---|---|---|---|
| Link 1 | 0.9 | 0.25 | 0.11 | 0.065 |
| Link 2 | 1.1 | 0.35 | 0.15 | 0.1 |

|  | Elastic Coefficient | Viscous Coefficient | Momentum |
|---|---|---|---|
| Muscle 1 (flexor muscle of joint 1) | 3 | 1 | 0.1 |
| Muscle 2 (extensor muscle of joint 1) | 1 | 2 | 0.1 |
| Muscle 3 (flexor muscle of joint 2) | 1 | 3 | 0.1 |
| Muscle 4 (extensor muscle of joint 2) | 2 | 1 | 0.1 |
| Muscle 5 (flexor muscle of the joints) both joints 1 and 2 | 1 | 2 | 0.1 |
| Muscle 6 (extensor muscle of the joints) both joints 1 and 2 | 2 | 1 | 0.1 |

The trajectory of the end-point and the elastic characteristics of the artificial muscles of the artificial muscle type manipulator are controlled. The desired trajectory of the end-point is moved from a start position (0.4, 0.1) to an end position (0.2, 0.3) on the x-y plane in 1 sec. and stayed at the end position for. 0.5 sec. The desired trajectory it denoted by ● of FIGS. 14A and 14B. Assuming that the elastic matrix of the expression (3) is a diagonal matrix, some elements of the desired trajectory of the elastic characteristic are assigned to constant values as represented by the expression (22) (each matrix element may not be constant).

$$K_{11}^d = b, \ K_{12}^d = 1, \ K_{22}^d = 3 \tag{22}$$

Considering the evaluation criterion of the expression (18), the expression (19) as the evaluation function is used so that all control inputs become positive.

FIGS. 14A to 14F, 15A to 15F, and 16A to 16F are graphs showing simulation results. FIGS. 14A to 14F show an initial state of the control apparatus. FIGS. 15A to 15F show a state in which the control inputs of the second embodiment have been repeatedly updated five times (from step (2) to step (5)). FIGS. 16A to 16F show a state in which the control inputs have been repeatedly updated 300 times.

FIGS. 14A to 14F show an initial state of the control apparatus. In the initial state, initial control inputs are selected and supplied so that the position of the end-point and the elastic characteristic satisfy the initial state of the target paths.

Figure 14A:
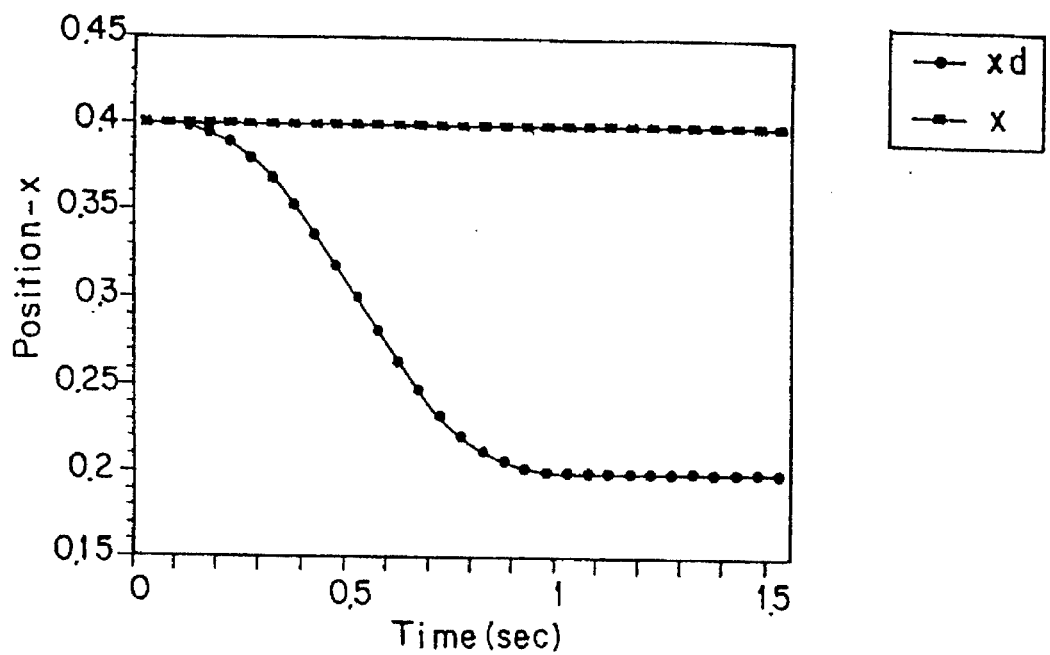
FIGS. 14A to 14F are graphs showing initial states of simulations of the control apparatus according to the present invention.
Figure 14B:
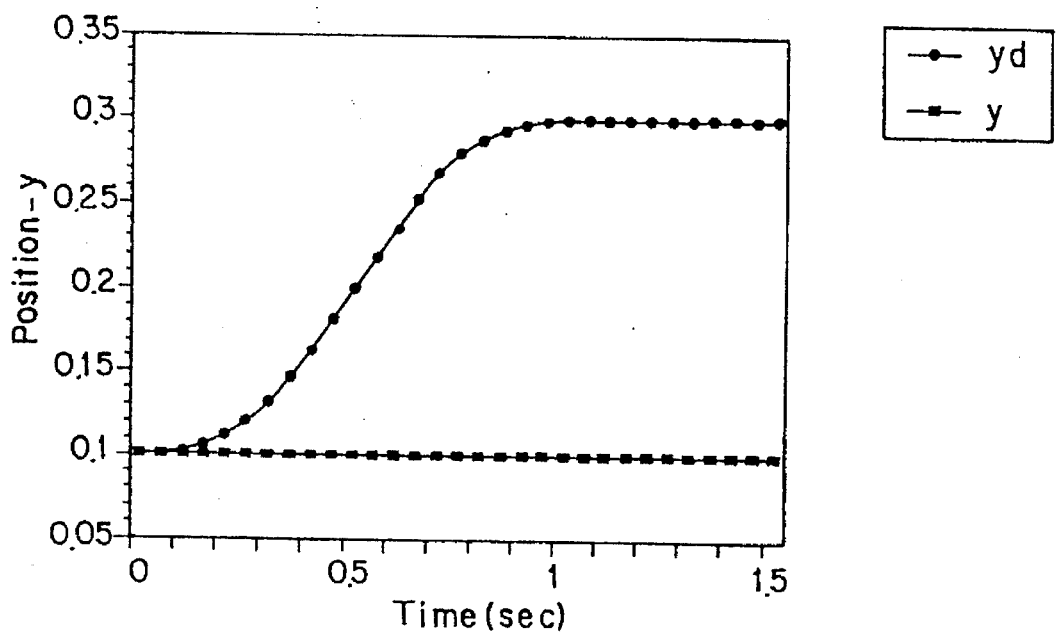

FIGS. 14A and 14B show paths of the tip as x and by coordinates, respectively. The lines denoted by ● represent the desired trajectories. The lines denoted by ■ represent the calculated paths of the tip. In this case, since the initial control inputs are constant values that satisfy the initial state of the target paths, the tip is still placed at the initial position.

Figure 14C:
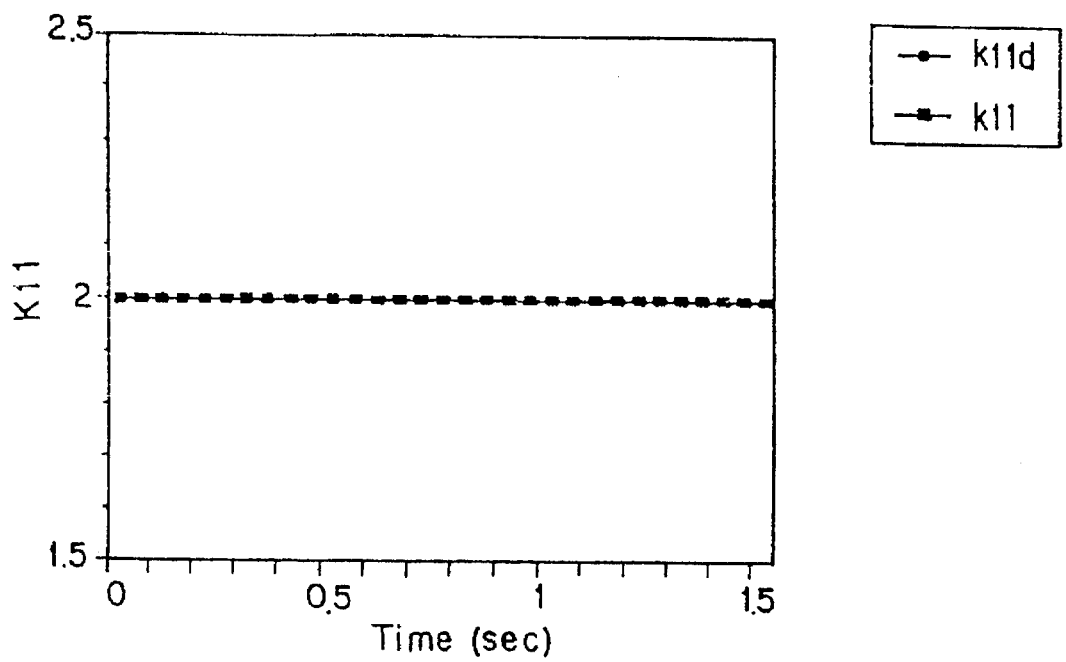
Figure 14D:
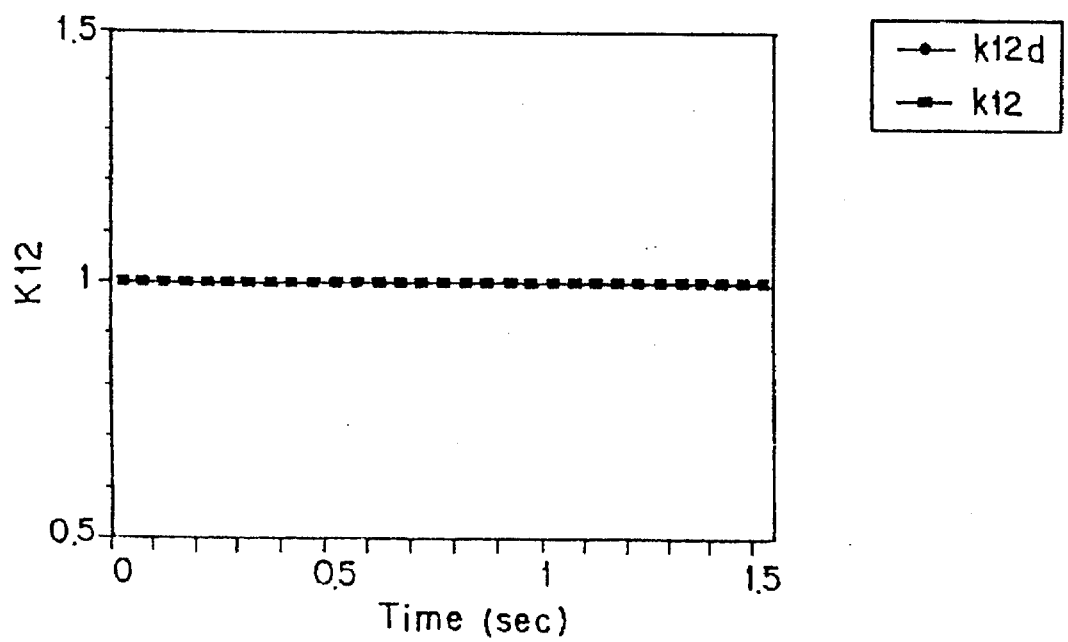
Figure 14E:
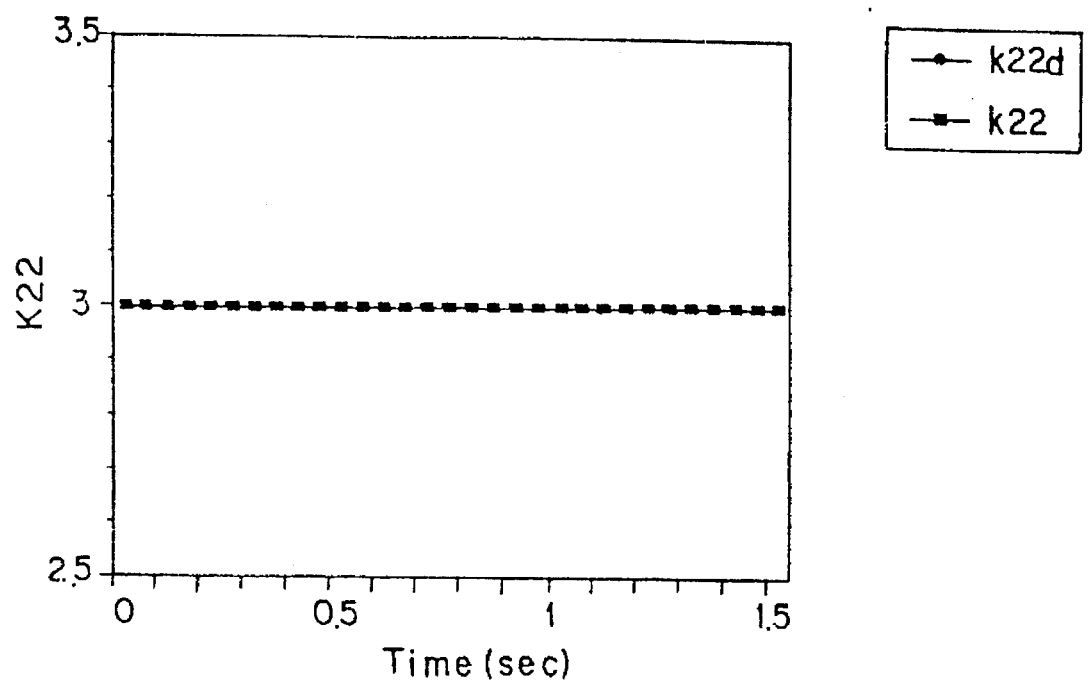
Figure 14F:
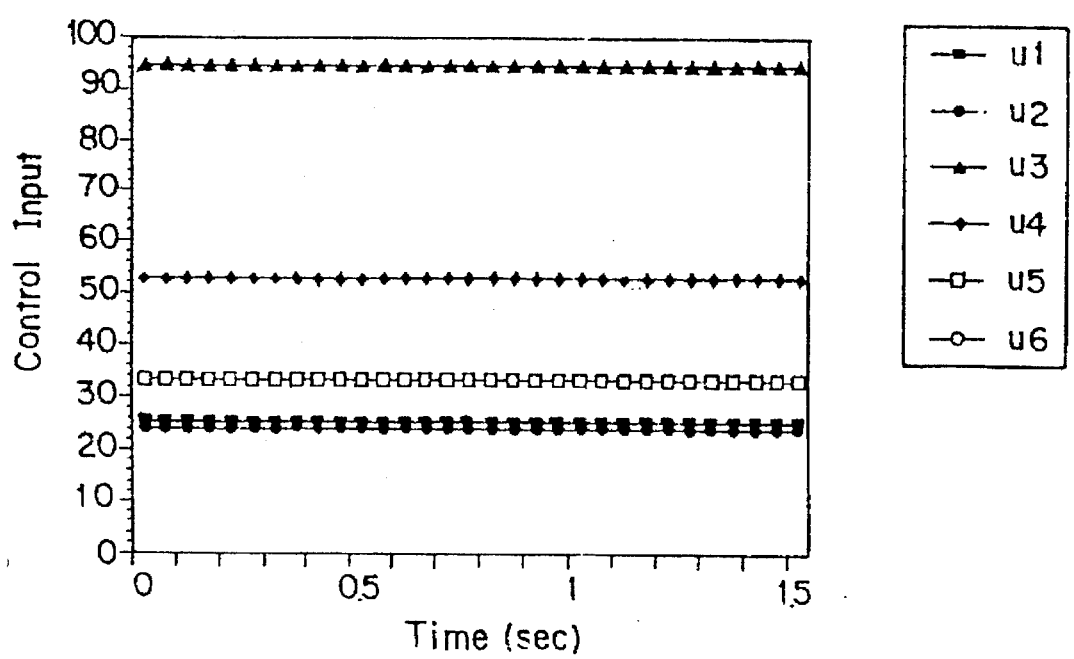
Figure 15A:
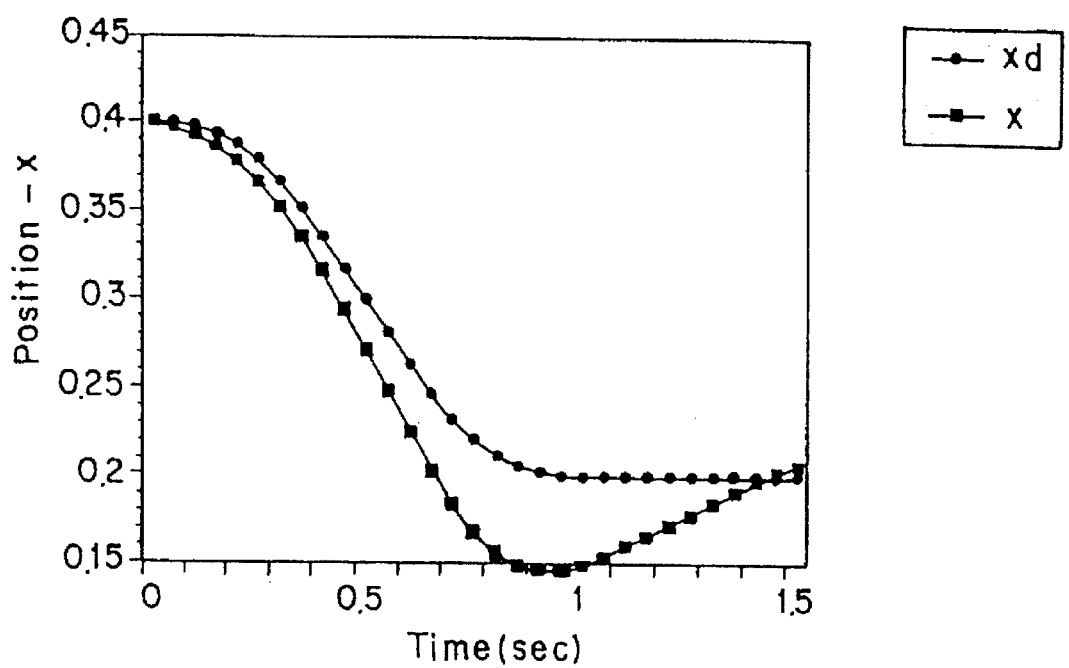
FIGS. 15A to 15F are graphs showing simulation results in the case that a control input of the control apparatus according to the present invention is updated five times.
Figure 15B:
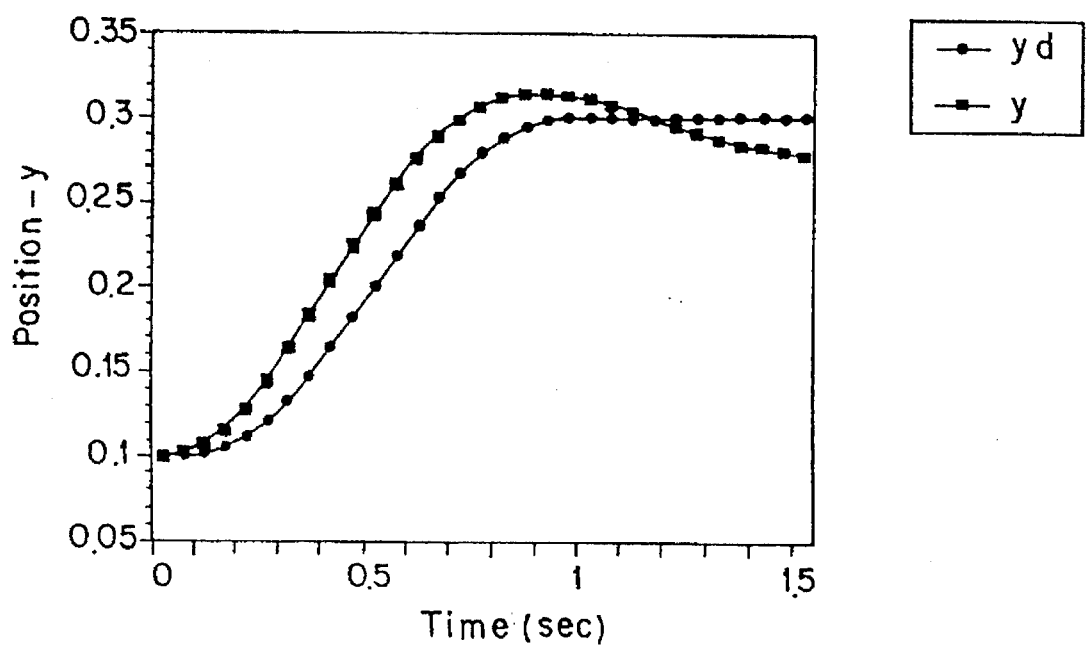
Figure 15C:
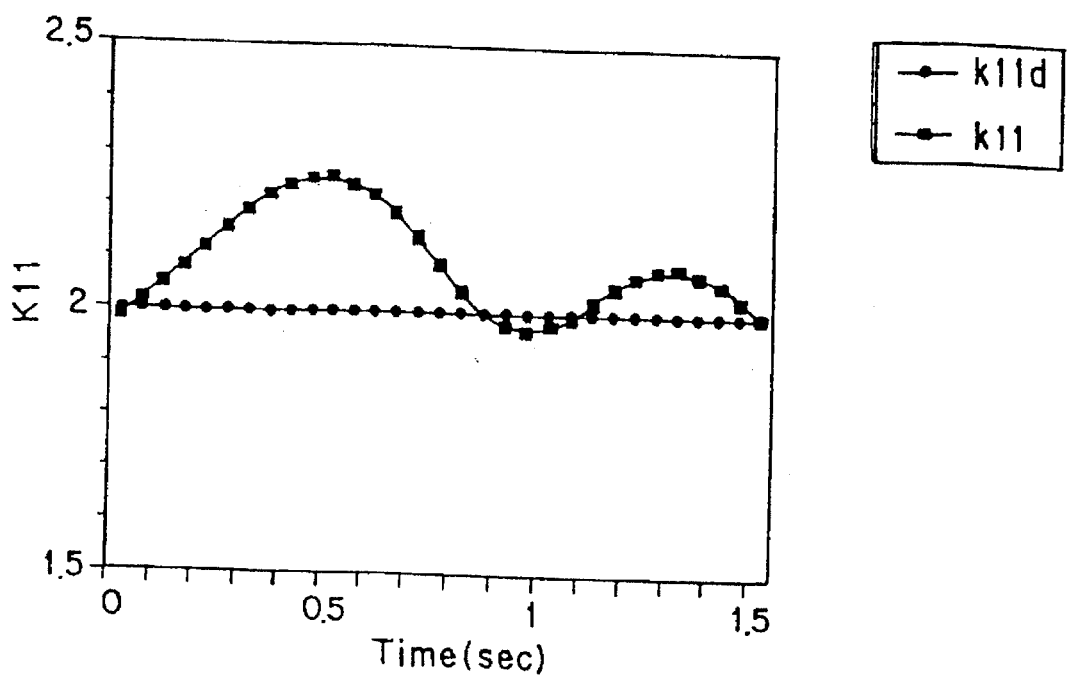
Figure 15D:
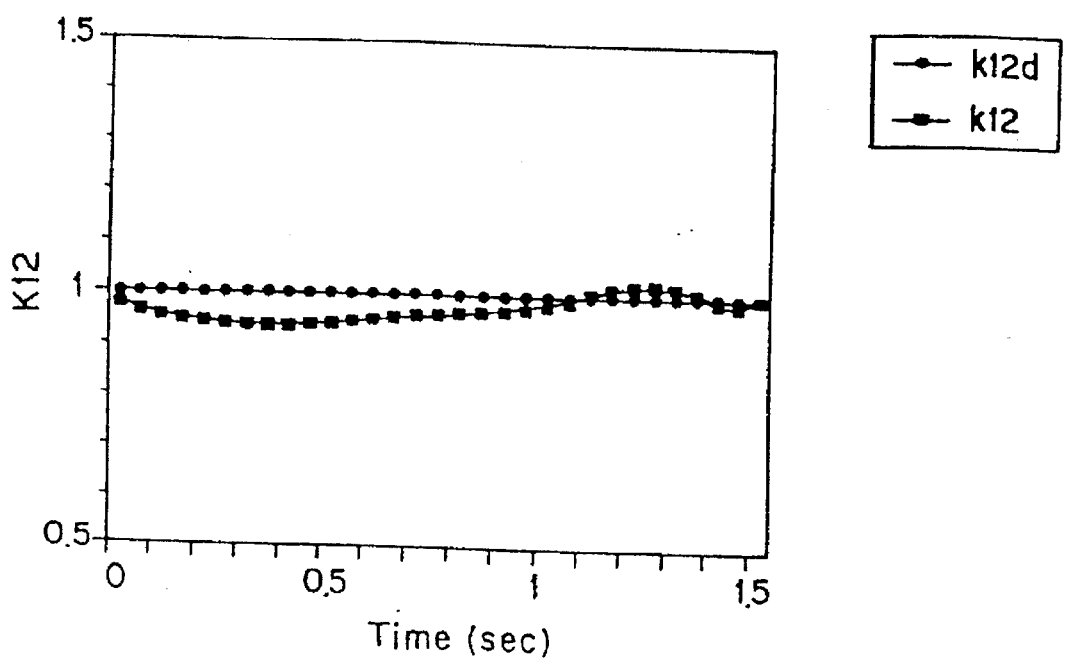
Figure 15E:
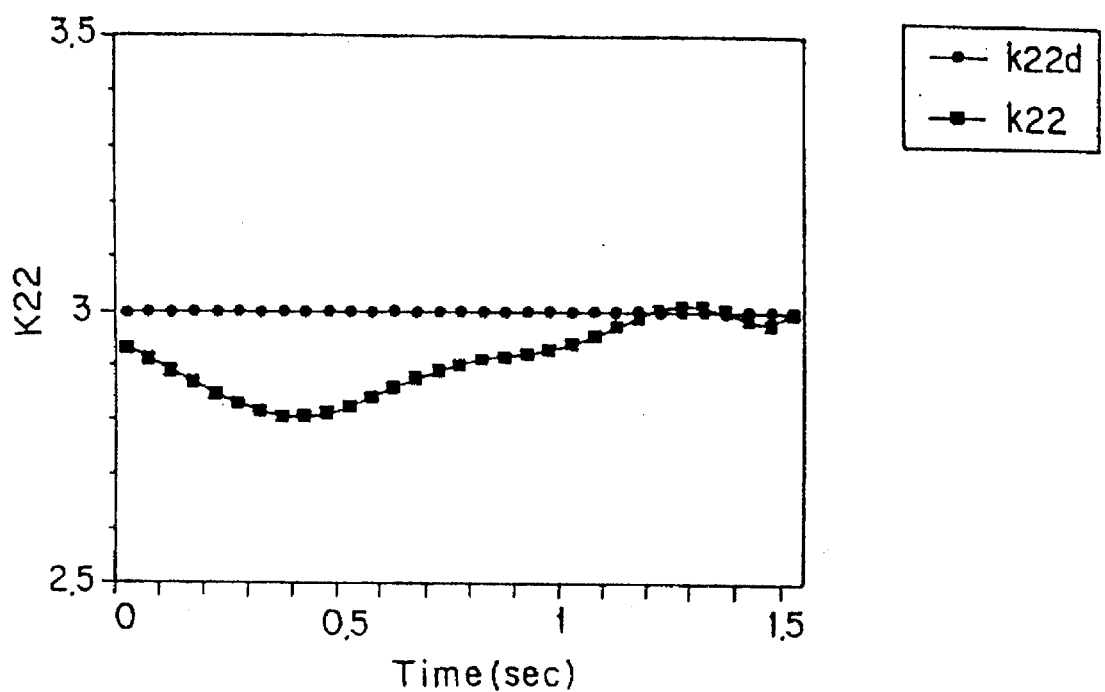
Figure 15F:
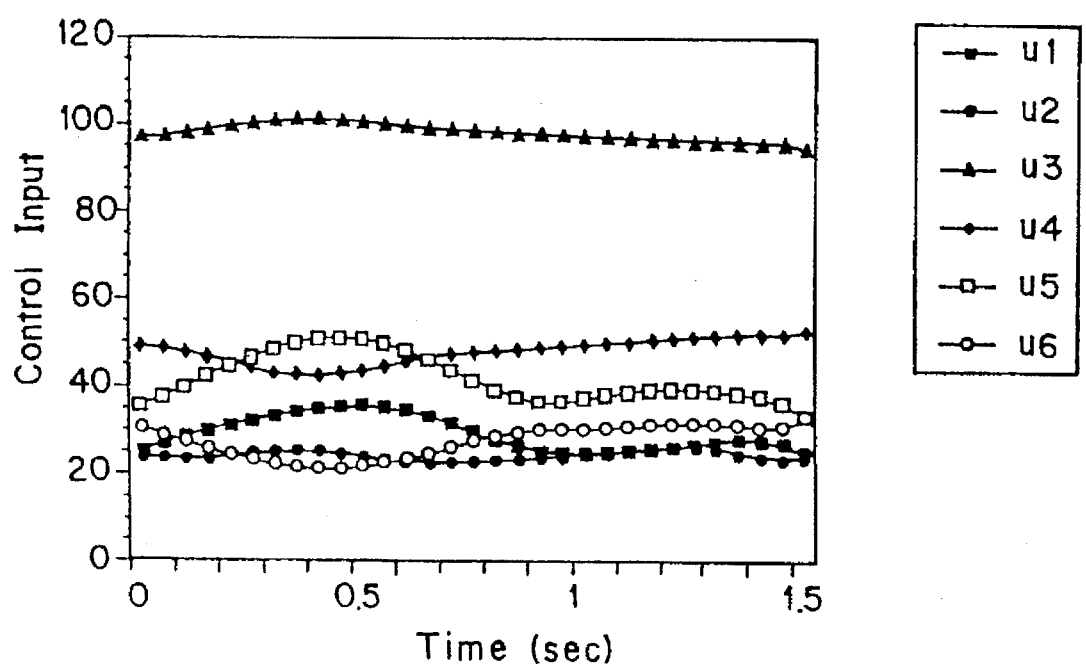

FIGS. 14C to 14E are graphs showing values of elements of the elastic characteristic matrix. Since the initial control inputs are selected so that they satisfy the initial state of the elastic characteristic matrix, the desired trajectory (line denoted by ●) corresponds with the calculated elastic characteristic (line denoted by ■). FIG. 14F shows control inputs of six artificial muscles that are constant values that satisfy the desired trajectory of the end-point and the initial state of the target elastic characteristic.

FIGS. 15A to 15F show a state in which control inputs have been repeatedly updated five times. Since control inputs that accomplish the desired trajectory have not been obtained, as is clear from FIGS. 15A to 15F, the path of the end-point does not correspond with the path of the elastic characteristic.

Figure 16A:
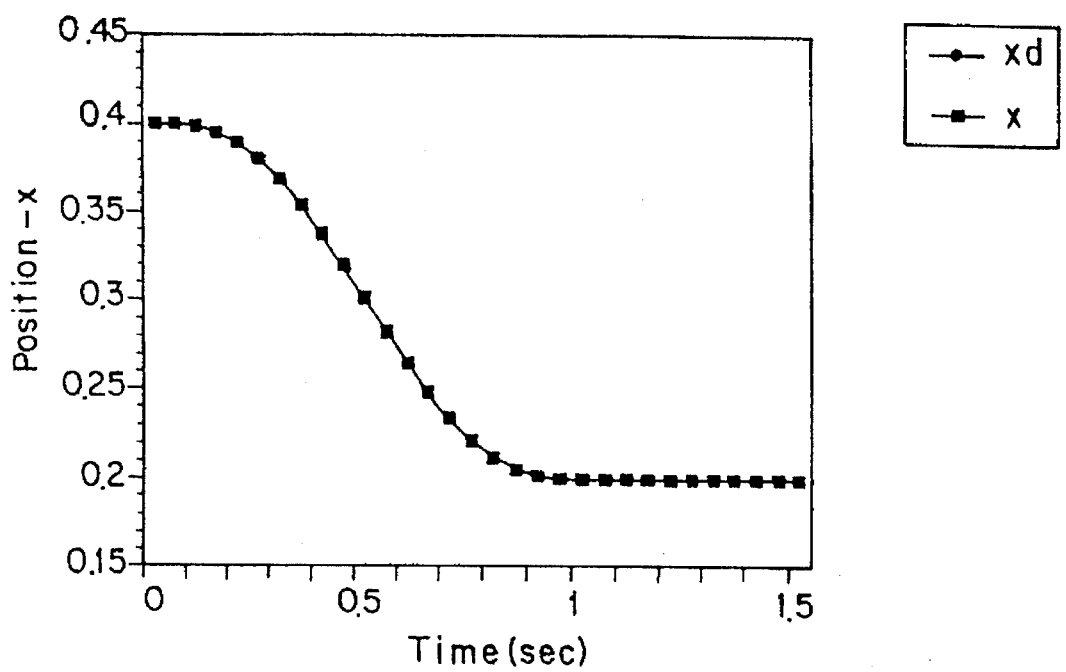
FIGS. 16A to 16F are graphs showing simulation results in the case that a control input of the control apparatus according to the present invention is updated three hundred times.
Figure 16B:
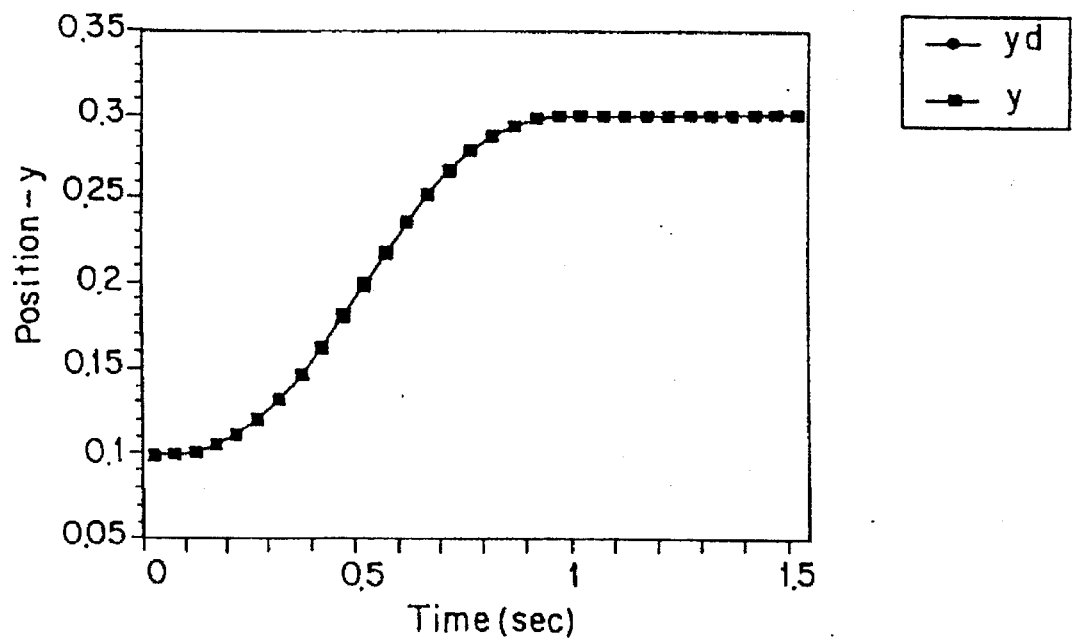
Figure 16C:
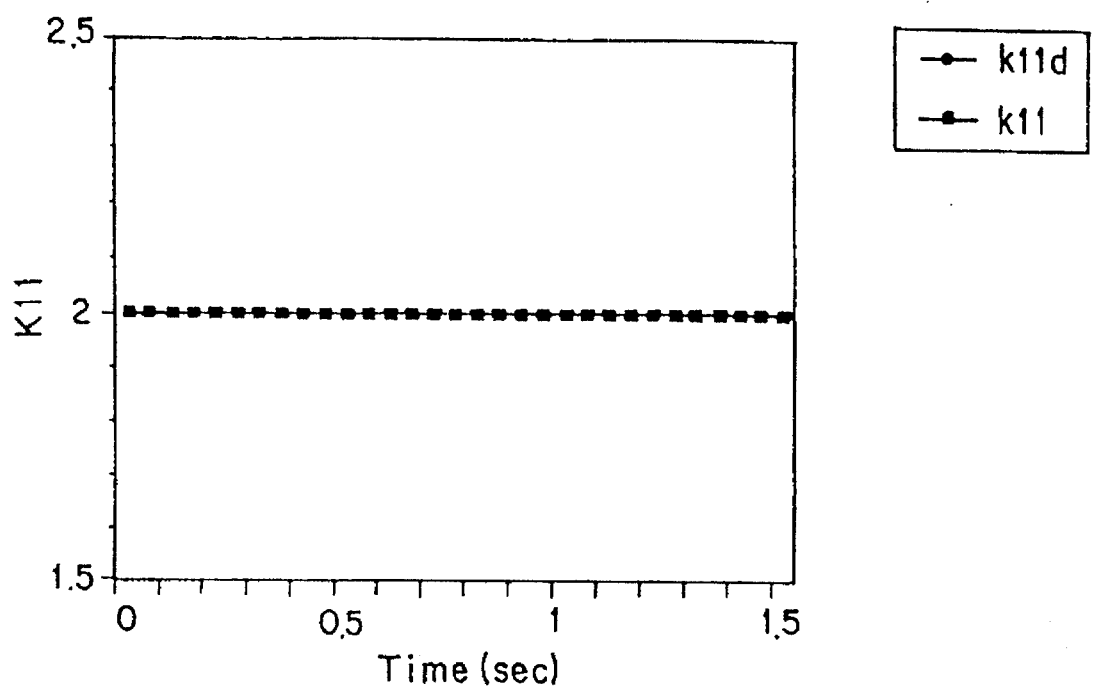
Figure 16D:
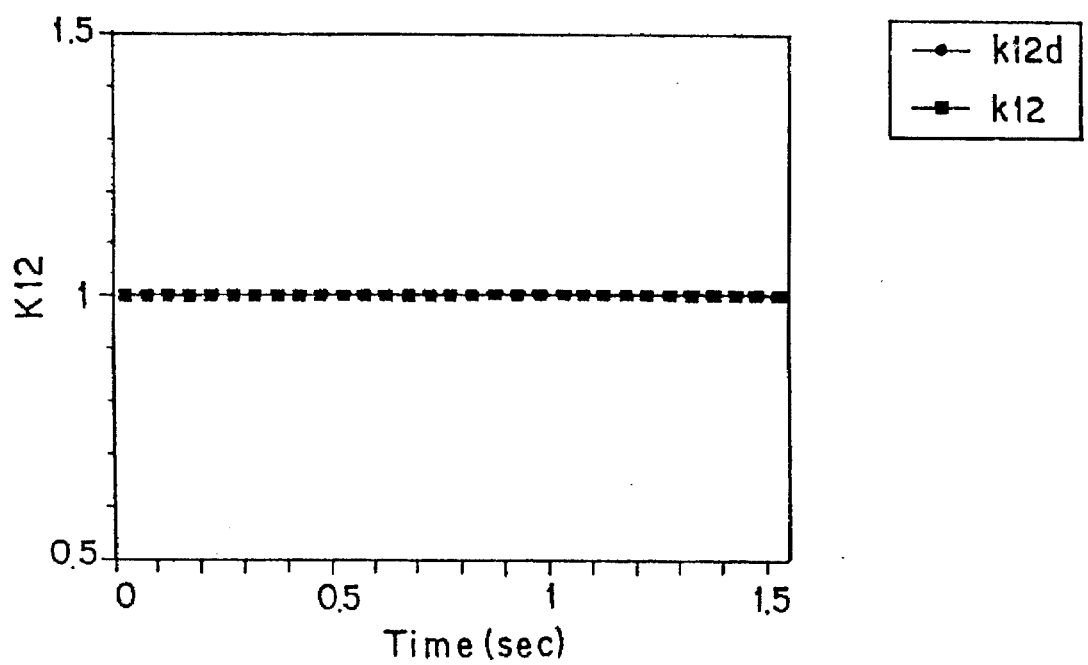
Figure 16E:
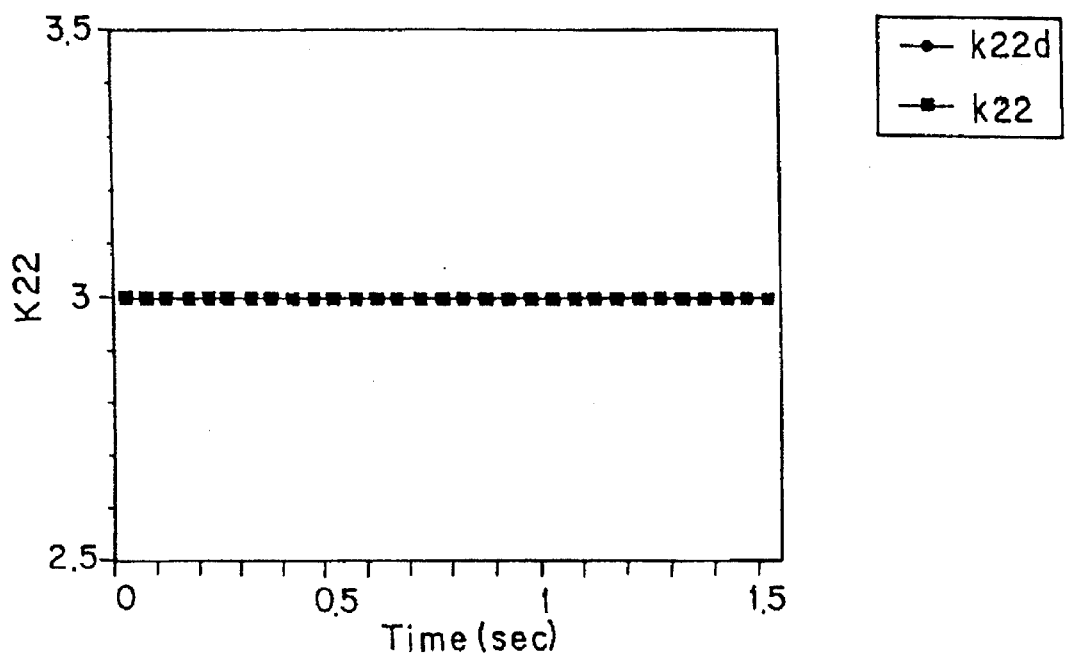
Figure 16F:
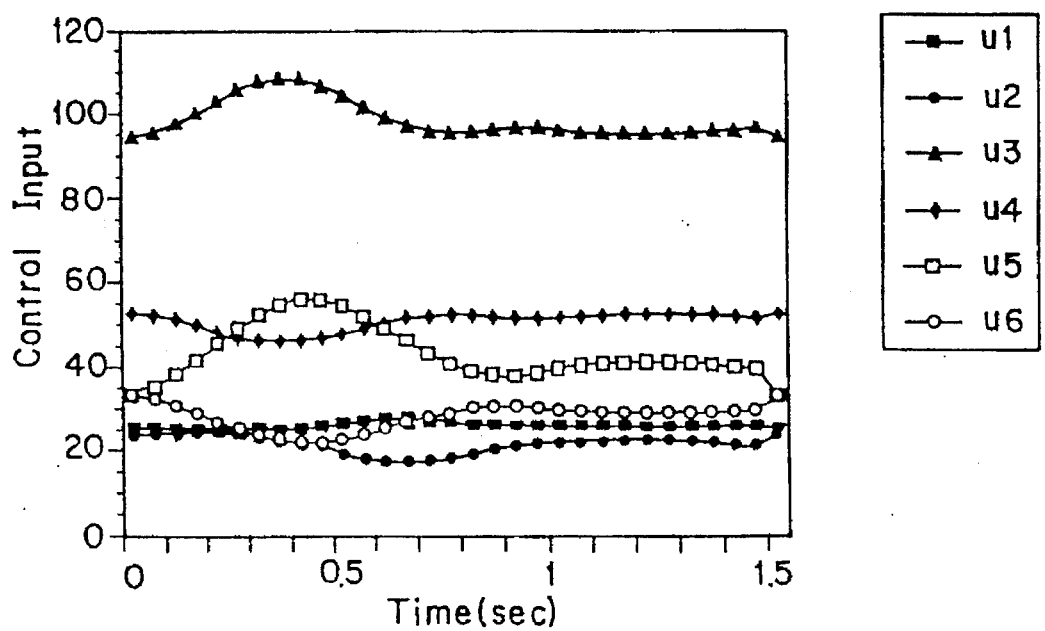

FIGS. 16A to 16F show a state in which control inputs have been repeatedly updated 300 times. FIG. 16F shows obtained control inputs.

FIGS. 16A to 16E show a result in which the control inputs shown in FIG. 16F are supplied to a forward system inner model. In these graphs, the calculated paths correspond with the desired trajectories. When the control inputs shown in FIG. 16F are supplied to the artificial muscle type manipulator, it is clear that both the desired trajectories and the elastic characteristic can be accomplished at the same time.

As described above, according to the present invention, in a non-linear system such as an artificial muscle type manipulator in which dynamic characteristics vary corresponding to control inputs, not only the conventional system outputs, but part of the dynamic characteristics of the system can be controlled. When desired trajectories are assigned to the system outputs and part of the dynamic characteristics, control inputs that accomplish them can be obtained so as to control the non-linear system.

In addition, when a neural network as a forward system inner model is used, even if the dynamics of a non-linear system are unknown, part of the dynamic characteristics can be controlled.

Moreover, since the values of parameters of an evaluation criterion that obtains optimum control inputs that accomplish desired trajectories are adjustable, the priority in control of system outputs and dynamic characteristics can be freely changed.

Furthermore, when control inputs are redundant, using this redundancy, control inputs that are optimum to a newly added evaluation criterion can be obtained.

Although the present invention has been shown and described with respect to best mode embodiments thereof, it would be understood by those skilled in the art that the foregoing and various other changes, omissions, and additions in the form and detail thereof may be made therein without departing from the spirit and scope of the present invention.

What is claimed is:

1. A control apparatus for controlling output values and dynamic characteristics of a non-linear system that vary corresponding to a control input, comprising:

output calculating means for inputting the control input and outputting a first output value based on dynamics of the non-linear system;

dynamic characteristics output means for inputting the control input and outputting a second output value corresponding to part of the dynamic characteristics of the non-linear system; and updating means for updating the control input so that the first output value of said output calculating means attains a desired output value and the second output value of said dynamic characteristics output means attains a desired dynamic characteristics value.

2. The control apparatus according to claim 1, wherein said updating means obtains a first error between the first output value of said output calculating means and the desired output value, obtains a second error between the second output value of said dynamic characteristics output means and the desired dynamic characteristics value, and obtains an update value for the control input by propagating back the first error to said output calculating means and the second error to said dynamic characteristics output means.

3. The control apparatus according to claim 2, wherein said updating means assigns a priority to the first and second errors for the back-propagation by applying weights to both the first error and the second error.

4. The control apparatus according to claim 1, wherein said updating means designates an evaluation criterion to obtain an update value for the control input and updates the control input corresponding to the evaluation criterion.

5. The control apparatus according to claim 4, wherein said updating means adds a new evaluation criterion to the evaluation criterion and updates the control input corresponding to the evaluation criterion and the new evaluation criterion when a degree of freedom of the control input of the non-linear system is more redundant than a degree of freedom of the output values and the dynamic characteristics of the non-linear system.

6. The control apparatus according to claim 1, wherein the non-linear system is a robot manipulator using an artificial muscle, and wherein said dynamics output means outputs an angle of a joint of the robot manipulator and an angular velocity of the joint.

7. A control apparatus for controlling output values and dynamic characteristics of a non-linear system that vary corresponding to a control input, comprising:

output calculating means, including a first neural network, for inputting the control input and outputting a first output value based on dynamics of the non-linear system;

dynamic characteristics output means, including a second neural network, for inputting the control input and outputting a second output value corresponding to part of the dynamic characteristics of the non-linear system; and updating means for updating the control input so that the first output value of said output calculating means attains a desired output value and the second output value of said dynamic characteristics output means attains a desired dynamic characteristics value.

8. The control apparatus according to claim 7, wherein the non-linear system is a robot manipulator using an artificial muscle.

9. The control apparatus according to claim 8, further comprising a third neural network responsive to a first relationship between the control input, the system output, and a torque of a joint of the robot manipulator, wherein said dynamic characteristic output means learns a second relationship between the control input, the system output, and a Jacobian corresponding to the dynamic characteristics, the Jacobian being obtained from a difference between a first torque value and a second torque value, the first torque value being obtained by inputting the control input and the system output to said third neural network with a synapse weight fixed, the second torque value being obtained by updating part of the system output by a small amount to produce resultant values input to said third neural network.

10. The control apparatus according to claim 8, further comprising a third neural network responsive to a first relationship between the control input, the system output, and a torque of a joint of the robot manipulator, and wherein said dynamic characteristics output means learns a second relationship between the control input, the system output, and a Jacobian corresponding to the dynamic characteristics, the Jacobian being obtained by propagating back an error of the torque from an output side of said third neural network with a synapse weight fixed.

11. A control apparatus for controlling output values and dynamic characteristics of a non-linear system that vary corresponding to a control input, comprising:

a unit circuit including output calculating means for inputting the control input and outputting a first output value based on dynamics of the non-linear system, dynamic characteristics output means for inputting the control input and outputting a second output value corresponding to part of the dynamic characteristics of the non-linear system, and updating means for updating the control input so that the first output value of said output calculating means attain a desired output value and the second output value of said dynamic characteristics output means attains a desired dynamic characteristics value; and target path updating means for updating the desired output value and the desired dynamic characteristics value that are input to said unit circuit whenever the control input is updated in said unit circuit.

12. A control apparatus for controlling output values and dynamic characteristics of a non-linear system that vary corresponding to a control input, comprising:

a plurality of unit circuits each of which including output calculating means for inputting the control input and outputting a first output value based on dynamics of the non-linear system, dynamic characteristics output means for inputting the control input and outputting a second output value corresponding to part of the dynamic characteristics of the non-linear system, and updating means for updating the control input so that the first output value of said output calculating means attains a desired output value and the second output value of said dynamic characteristics output means attains a desired dynamic characteristics value; and adding means for adding a value based on the first output received from a particular one of said unit circuits to an output value of a unit circuit in a preceding stage and for outputting a resultant value to a unit circuit in a next stage.

13. The control apparatus according to claim 12, wherein said updating means of each of said unit circuits obtains a first error between the first output value of said output calculating means and the desired output value, obtains a second error between the second output value of said dynamic characteristics output means and the desired dynamic characteristics value, and obtains an update value for the control input by adding a first value obtained by propagating back the first error to the output calculating means to a second value obtained by propagating back the second error to the dynamic characteristics output means, and wherein said adding means adds the first error input to the particular one of said unit circuits to the first value that is obtained by propagating back the first error to said output calculating means, adds a resultant value to the second value that is propagated back from a unit circuit in the next stage, and propagates back a resultant value to the unit circuit in the preceding stage.

14. A control method for controlling output values and dynamic characteristics of a non-linear system that vary corresponding to a control input, comprising the steps of:

calculating a first value based on dynamics of the non-linear system using the control input;

calculating a second value corresponding to part of the dynamic characteristics of the non-linear system using the control input; and updating the control input so that the first value corresponding to the dynamics attains a desired output value and the second value corresponding to the part of the dynamic characteristics attains a desired dynamic characteristics value.

15. A control method for controlling output values and dynamic characteristics of a non-linear system that vary corresponding to a control input, comprising the steps of:

calculating a first value based on dynamics of the non-linear system using the control input;

calculating a second value corresponding to part of the dynamic characteristics of the non-linear system using the control input;

obtaining a first error between the first value and a desired output value;

obtaining a second error between the second value and a desired dynamic characteristics value; and obtaining an update value for the control input corresponding to the first error and the second error to update the control input.

16. A calculating method for calculating dynamic characteristics of a robot manipulator that vary corresponding to a control input using a neural network, comprising the steps of:

supplying the control input to the robot manipulator;

detecting an output value and a torque of an articulation of the robot manipulator;

causing the neural network to learn a relationship between the control input, the output value, and the torque of the articulation;

fixing a synapse load of the neural network;

supplying the control input and the output value to the neural network to obtain a first torque value;

updating part of the output value for a small update value and supplying resultant values to the neural network to obtain a second torque value; and obtaining a Jacobian corresponding to the dynamic characteristics using the difference between the first torque value and the second torque value, and the small update value.

17. A calculating method for calculating dynamic characteristics of a robot manipulator that vary corresponding to a control input using a neural network, comprising the steps of:

supplying the control input to the robot manipulator;

detecting a system output and a torque of a joint of the robot manipulator;

causing the neural network to learn the relationship between the control input, the system output, and the torque of the joint;

fixing a synapse weight of the neural network;

inversely propagating an error of the torque received from an output side of the neural network; and treating a Jacobjan obtained from an input side of the neural network as dynamic characteristics of the robot manipulator.

18. A control method for controlling output values and dynamic characteristics of a non-linear system that vary corresponding to a control input, comprising the steps of:

calculating a first value based on dynamics of the non-linear system using the control input;

calculating a second value corresponding to part of the dynamic characteristics of the non-linear system using the control input;

updating the control input so that the first value attains a desired output value and the second value attains a desired dynamic characteristics value; and updating the desired output value and the desired dynamic characteristics value and obtaining a control input corresponding to a next path whenever the control input is determined.

19. A control apparatus for controlling outputs of a non-linear system in which dynamic characteristics vary corresponding to a control input, comprising:

output calculating means, in which the control input is inputted, for calculating output values of the non-linear system based on dynamics of the non-linear system;

dynamic characteristics calculating means, in which the control input is inputted, for calculating at least a part of the dynamic characteristics of the non-linear system; and updating means, when a first desired trajectory is assigned to one of the output values of the non-linear system and a second desired trajectory is assigned to at least a part of the dynamic characteristics of the non-linear system, for matching the output values calculated said output calculating means with the first desired trajectory, and for matching the dynamic characteristics calculated by said dynamic characteristics calculating means with the second desired trajectory, by updating the control input.

20. A control apparatus for controlling outputs of a non-linear system in which dynamic characteristics vary corresponding to a control input, comprising:

output calculating means, in which the control input is inputted, for calculating output values of the non-linear system based on a kinetic equation describing a relationship between the control input and the outputs of the non-linear system;

dynamic characteristics calculating means, in which the control input is inputted, for calculating at least a part of coefficients of the kinematic equation; and updating means, when a first desired trajectory is assigned to the outputs of the non-linear system and a second desired trajectory is assigned to at least a part of the dynamic characteristics of the non-linear system, for matching the output values calculated by said output calculating means with the first desired trajectory, and for matching the coefficients of the kinematic equation calculated by said dynamic characteristics calculating means with the second desired trajectory, by updating the control input.

* * * * *